(12) United States Patent
Farr, III

(10) Patent No.: US 8,006,936 B1
(45) Date of Patent: Aug. 30, 2011

(54) PARACHUTE DEPLOYMENT CONTROL

(76) Inventor: Warren W. Farr, III, Moreland Hills, OH (US)

(*) Notice: Subject to any disclaimer, the term of this patent is extended or adjusted under 35 U.S.C. 154(b) by 1038 days.

(21) Appl. No.: 11/807,014

(22) Filed: May 25, 2007

Related U.S. Application Data

(60) Provisional application No. 60/809,692, filed on May 31, 2006, provisional application No. 60/903,932, filed on Feb. 28, 2007.

(51) Int. Cl.
*B64D 17/00* (2006.01)
(52) U.S. Cl. ............ 244/147; 244/151 B; 244/149; 244/150; 244/173.3; 280/728.1; 280/701.45; 294/82.25
(58) Field of Classification Search ............ 244/151 B, 244/149, 150, 173.3; 280/728.1, 701.45; 294/82.25
See application file for complete search history.

(56) References Cited

U.S. PATENT DOCUMENTS

| | | | | |
|---|---|---|---|---|
| 757,825 | A | | 4/1909 | Maul .................... 396/7 |
| 2,768,802 | A | * | 10/1956 | Dejean .............. 244/138 R |
| 2,841,084 | A | | 7/1958 | Carlisle ................ 102/348 |
| 2,987,279 | A | * | 6/1961 | Gray ..................... 244/151 |
| 3,015,463 | A | | 1/1962 | Gross .................... 244/147 |
| 3,113,752 | A | * | 12/1963 | Brestel ................. 244/147 |
| 3,221,656 | A | | 12/1965 | Sutten .................. 102/348 |
| 3,450,377 | A | * | 6/1969 | Mitchell ............... 244/149 |
| 3,452,471 | A | | 7/1969 | Street .................... 446/63 |
| 3,554,147 | A | * | 1/1971 | Spanel ................... 112/79 |
| 3,694,863 | A | * | 10/1972 | Wasserlein, Jr. ......... 24/16 PB |
| 3,719,145 | A | * | 3/1973 | Brown et al. ............. 102/351 |
| 3,787,013 | A | | 1/1974 | McKenzie, Sr. .......... 244/155 |
| 3,943,656 | A | | 3/1976 | Green ..................... 46/74 |
| 3,985,321 | A | * | 10/1976 | Woolman et al. ......... 244/150 |
| 4,008,541 | A | | 2/1977 | Russer ................... 46/86 |
| 4,279,392 | A | | 7/1981 | Saxton ................... 244/150 |
| 4,333,400 | A | | 6/1982 | McNelia et al. .......... 102/348 |
| 4,513,931 | A | | 4/1985 | Kenzie ................... 244/152 |
| 4,519,315 | A | | 5/1985 | Arszman ................ 102/377 |
| 4,687,455 | A | | 8/1987 | Sculatti ................... 446/52 |
| 4,757,430 | A | * | 7/1988 | Dubak et al. ............. 362/100 |
| 4,765,571 | A | | 8/1988 | Barbe .................... 244/151 |

(Continued)

FOREIGN PATENT DOCUMENTS

WO WO 2006/065406 A3 * 6/2006

OTHER PUBLICATIONS

U.S. Appl. No. 60/627,005, filed Nov. 2004.*

*Primary Examiner* — Tien Dinh
*Assistant Examiner* — Justin Benedik
(74) *Attorney, Agent, or Firm* — David A. Burge

(57) ABSTRACT

In one form of the invention, a deployment control for releasing a rocket recovery device such as a parachute includes an electrical heating element extensible along a heat-severable reach of an elongate retainer capable of being wrapped closely about the recovery device to retain the recovery device in a compact form until the reach is severed as the result of electricity being supplied to the heating element to thereby release and deploy the recovery device. In other forms, an apparatus for cutting a heat meltable retainer to release and deploy a rocket recovery device includes a heating element extending along at least a short reach of the retainer, and a control device for supplying electricity to the heating element for heat severing the retainer reach.

14 Claims, 12 Drawing Sheets

U.S. PATENT DOCUMENTS

| | | | |
|---|---|---|---|
| 4,783,027 A | 11/1988 | Jones | 244/149 |
| 4,865,273 A * | 9/1989 | Jones | 244/149 |
| 5,054,397 A * | 10/1991 | Hans et al. | 102/348 |
| 5,183,960 A | 2/1993 | Shires | 102/348 |
| 5,232,184 A * | 8/1993 | Reuter | 244/147 |
| 5,239,927 A | 8/1993 | Frye et al. | 102/387 |
| 5,370,057 A | 12/1994 | Badura et al. | 102/378 |
| 5,386,781 A | 2/1995 | Day | 102/340 |
| 5,407,375 A | 4/1995 | Johnson | 446/52 |
| 5,549,497 A | 8/1996 | Johnson | 446/52 |
| 5,578,373 A * | 11/1996 | Kobayashi et al. | 428/364 |
| 5,951,354 A | 9/1999 | Johnson | 446/52 |
| 6,155,421 A * | 12/2000 | Cooper | 206/400 |
| 6,471,160 B2 | 10/2002 | Grieser | 244/139 |
| 6,478,648 B1 | 11/2002 | Applewhite et al. | 446/52 |
| 6,565,041 B1 * | 5/2003 | Young et al. | 244/139 |
| 6,817,579 B2 * | 11/2004 | van der Velden et al. | 244/137.2 |
| 2003/0218100 A1 * | 11/2003 | Preston | 244/149 |
| 2004/0155018 A1 * | 8/2004 | Umetsu et al. | |
| 2005/0127243 A1 * | 6/2005 | Voronka et al. | 244/150 |
| 2006/0145015 A1 * | 7/2006 | Preston | 244/149 |

* cited by examiner

PARACHUTE DEPLOYMENT CONTROL

REFERENCE TO PROVISIONAL APPLICATIONS

This application claims the benefit of the filing by Warren W. Farr, III on May 31, 2006 of provisional application Ser. No. 60/809,692 referred to herein as the "First Provisional Application" or the "FPA," the disclosure of which is incorporated herein by reference.

This application also claims the benefit of the filing by Warren W. Farr, III on Feb. 28, 2007 of provisional application Ser. No. 60/903,932, referred to herein as the "Second Provisional Application" or the "SPA," the disclosure of which is incorporated herein by reference.

BACKGROUND

This application relates to the controlled deployment of recovery devices such as parachutes and, more particularly, relates to methods and apparatus that enable recovery devices such as parachutes to be deployed, when desired, to facilitate the safe return to ground of descending bodies such as components of a hobby or high power rocket that typically have been caused to separate at or near flight apogee once the rocket has lifted aloft its components and the accompanying recovery device.

An objective that can be addressed and admirably served by the inventive features that are disclosed herein is to increase the probability of a complete and safe recovery of a rocket when flown to high altitudes and/or when flown in breezy conditions, so that higher flights can be made than previously would have been attempted for the same field size and weather conditions.

As was disclosed in the FPA, it is preferable that hobby and high power rockets be flown only if they are equipped with suitable recovery devices or systems that enable components of the rockets to return safely to the ground and be recovered. A technique commonly used to initiate the deployment of a model rocket recovery device is to cause releasably connected components of the tubular body of the rocket to separate at or near the time when the rocket reaches the apogee of its flight, whereupon a recovery device is ejected from a compartment of the rocket body and promptly deployed.

Two of the more common recovery devices that may be ejected and deployed when rocket components are caused to separate are streamers that unfurl, and parachutes that unfold so their canopies catch the wind. The deployment of each of these recovery devices can desirably enhance the likelihood of safe recovery because each improves the visibility of the descending components, and each slows the descent of the components to minimize and hopefully avert damage due to ground impact.

Prior to launch, the separable components of a rocket usually are tethered together and to the accompanying recovery device(s) by what is called a "recovery harness" or "shock cord." Upon separation of the rocket components, and upon ejection and deployment of an accompanying recovery device, the rocket components may tumble during their descent to ground. If the tethered rocket components are accompanied during their descent by only a small unfurled streamer that serves mainly to enhance visibility (i.e., if no other deployed recovery device such as a parachute is attached to the descending components), the components tend to descend rather quickly, usually without being wind blown away from the air space above the launch site. However, to slow component descent and minimize the detrimental effects that can result from high momentum ground impact, at least a small deployed parachute usually is provided to accompany the tethered-together components as they descend.

A problem commonly encountered when even a relatively small parachute is deployed at a relatively high altitude (e.g., at or near flight apogee altitude), is that winds aloft are likely to engage the deployed chute's canopy and carry the chute-supported components a significant distance away from the launch site before the tethered components descend to ground level. This may result in the tethered, parachute supported components traveling for miles away from the launch site before they land, being lost from view long before they land, and/or landing where they cannot be found or retrieved.

To ensure that separable components of the body of a rocket properly separate at or near flight apogee, and/or to ensure that a recovery device properly ejects (so it can promptly deploy) from the rocket body component or components used to carry the recovery device aloft, it is common to fire a black powder ejection charge internally of the rocket's body at the conclusion of the burn of a rocket engine (i.e., at or near the time when the rocket reaches the apogee of its flight), or to release a charge of gas such as carbon dioxide from a pressurized cylinder carried within the rocket's body. Either of these actions can cause an interior region of the rocket's body to become sufficiently pressurized to effect separation of adjacent tubular body components of the rocket, and/or to cause ejection of a recovery device which then promptly deploys, as by unfurling or unfolding.

If only one recovery device is ejected for prompt deployment by the recovery system of a rocket, the recovery system may be said to be of the "single deployment" type. If two distinct recovery device ejections are employed, each causing the deployment of a separate, promptly deploying recovery device, the recovery system may be said to be of the "dual deployment" type.

Single deployment recovery systems can offer the very significant advantages of simplicity, low cost and ease of use 1) because the same firing of an ejection charge used to separate rocket body components also can be used to eject a recovery device, 2) because the ejection charge to be fired can be built into the engine module used to launch the rocket to a desired altitude, and 3) because the firing of the ejection charge can be initiated substantially automatically by the engine module at the conclusion of the engine burn that lifts the rocket aloft. These features are well known to those skilled in the art, and engines of a wide variety of sizes and power that offer these features can be purchased from entities that supply the needs of rocket enthusiasts.

In a single deployment recovery system of the type just described, the ejected recovery device usually consists of a streamer, a parachute or a combination of a streamer and a parachute. Upon ejection, the streamer unfurls and/or the parachute unfolds to open as its canopy is caught by the wind—and all this takes place without having to provide, carry aloft or operate other apparatus such as a second or supplemental ejection charge, a cylinder of pressurized gas, an altitude sensor, or controls that may include electronic circuitry and a battery to power the circuitry—items that can add unwanted weight and complexity. The user simply selects the correct certified engine to launch the rocket, to separate its components, and to eject the recovery device; and, when the rocket is flown, the recovery device ejects and deploys at or near flight apogee in conjunction with the separation of the rocket's components.

Although the simplicity and minimal cost of single deployment recovery systems has resulted in wide use of this type of recovery system, the resulting slow, wind-blown descent of tethered rocket components supported by a recovery device such as a parachute that was deployed at a high altitude causes many reusable rockets to go unrecovered. This puts a significant damper on the willingness of rocket enthusiasts to launch until after others have flown their rockets and established that the winds aloft are sufficiently minimal (to minimize concerns about descending, recovery-device-supported components being blown away from the launch site and perhaps never recovered) to yield a reasonable likelihood of recovery. Moreover, the high probability of rocket loss associated with the use of single deployment recovery systems often causes rocket enthusiasts to severely limit the sizes of the engines they use, and the altitudes to which they launch their rockets, which can significantly diminish the thrill and enjoyment that are associated with the energetic liftoff and lengthy, sustained flight times of rockets propelled by larger engines that produce higher thrust.

Launch fields of small size, and launch fields that are bordered by restricted properties, by obstacles such as swamps, marshes, crops, powerlines, trees and the like, or by waterways such as streams, rivers and lakes, also tend to deter the flying of high power rockets because the slow, parachute supported descent of separated rocket components can subject the components to the influence of winds aloft, causing the components to be carried well beyond the bounds of the launch field to locations where the components either cannot be found or cannot be recovered. The recovery of a rocket is rendered safer if landed components need not be recovered from difficult terrain, and if rocket components are not found hanging on power lines, power poles, trees and the like.

When a dual deployment recovery system is used, it is common 1) for a streamer and/or a small parachute to be ejected and deployed at or near flight apogee, usually in conjunction with separation of components of the rocket's body, and 2) for a considerably larger parachute (a so-called "primary recovery device") to be ejected and deployed once the tethered, separated rocket components have descended to a significantly lower altitude, preferably to a height that is only a few hundred feet above ground level. Although the task of providing a rocket with a dual deployment recovery system which includes a primary recovery device (typically a sizable parachute that ejects and deploys at a relatively low altitude) usually increases rocket complexity, cost, size and weight, dual deployment recovery systems nevertheless remain desirable inasmuch as their use can significantly improve the chances of locating and retrieving components of a flown rocket because the deployment of the primary means of recovery during only the final few seconds of rocket component descent minimizes the amount of time during which the descending components are supported by a sizable parachute that is likely to be wind-blown away from the launch site, hence the prospect of a sure and easy recovery is maximized.

What may not have been fully appreciated about dual deployment recovery systems is: 1) that regardless of the type of recovery device that is deployed by the system at a relatively high altitude, the deployed recovery device probably will do very little to address the very major concern that recovery-device-supported components will be blown away from the launch site and perhaps even lost to recovery; 2) that the deployment of almost any sort of recovery device at a high altitude may, in fact, exacerbate the problem of wind-blown component travel because the deployed recovery device adds significantly to the surface area (of the descending, tethered components) that can be engaged by winds aloft, and therefore may cause rocket components to travel farther from the launch site than they would have traveled if no recovery device at all had been deployed at a high altitude; and 3) that the one aspect of dual deployment recovery systems that actually does tend to help alleviate the problem (of rocket components being held aloft by a deployed recovery device that is engaged by the wind thereby causing valuable rocket components to be spirited away from the launch site) is the introduction into the recovery cycle of a delay in the deployment of a sizable recovery device until the separated components have descended to near ground level so the time of exposure to wind (of the sizable surface area of the recovery device deployed at the last possible moment) is minimized.

Stated in another way, in dual deployment recovery systems, it is the delay in the deployment of a primary recovery device (its deployment is delayed until near the very end of the descent of the tethered components when the tethered components are most rapidly approaching the ground, and when very little distance remains to be traversed until the components land) that causes the time to be minimized during which a deployed recovery device, such as a sizable parachute with open canopy, is exposed to wind that may cause the recovery device and the rocket components tethered thereto to travel a significant distance from the launch site. Moreover, because the wind encountered at ground level often is far less brisk than is the unobstructed flow of wind aloft, delaying the deployment of a sizable primary recovery device until descending components have nearly reached the ground often results in the descending components and their associated recovery device being subjected to winds of a less forceful nature than are likely to be encountered at higher altitudes.

If the delayed chute deployment advantages just described (that are associated with the use of dual deployment recovery systems) could somehow be combined with the earlier-described advantages of simplicity, low cost, low weight and small space requirements (that are associated with the use of single deployment recovery systems), perhaps the result of such a combination might provide recovery methods and apparatus that do not occupy much space, do not add much weight, are simple and inexpensive to use, and might therefor be suitable for use with rockets of a wide range of sizes including rockets of small size, to minimize the kinds of recovery problems described above that are commonly encountered with present day recovery systems.

Disclosed in the FPA are features of a parachute deployment control system that addresses many of the foregoing and other concerns and drawbacks of the prior art by providing methods and apparatus that can be used with descending bodies such as rockets that have been flown to desired altitudes to deploy recovery devices 1) at desired times, 2) at desired lengths of time after either a particular condition is sensed or a particular signal is received, or 3) promptly in response to a received signal for such purposes as minimizing the wind-blown airborne travel of the descending bodies such as rockets to facilitate recovery, preferably in reasonably close proximity to their launch sites.

Included in the disclosure of the FPA are methods and apparatus that can be used to delay the deployment of an ejected recovery device such as a parachute which preferably is retained in a compact, non-deployed form until the optimal moment is at hand for its deployment. The disclosed features can be incorporated into new rockets as they are designed and built, or may be added as retrofits to existing rockets. And, because the apparatus needed to implement these features can be quite small and lightweight, the disclosed features can be added to rockets of a wide range of sizes, including rockets of quite small size launched by relatively low thrust.

Although others have recognized the desirability of diminishing the time during which descending bodies (typically comprised of components that are to be recovered) are supported by deployed recovery devices to minimize the likelihood that the descending bodies and their appended recovery devices will be blown by the wind to undesirable locations where recovery may be difficult or impossible, the disclosure of the FPA recognizes and uses to good advantage the realization that a recovery device can be harmlessly ejected at a relatively high altitude to descend in a compact form with whatever needs to be recovered, if the actual deployment of the recovery device is delayed until its descent has reached a low altitude, whereupon the recovery device is deployed from the compact form in which it has been retained during descent, and the recovery device then serves to slow the remainder of the descent to ground. In this manner, the "descent slowing" function of the recovery device can be initiated at substantially the last possible moment before touchdown, the exposure to wind of the sizable surface area of the recovery device is limited to a final few moments of descent time, and the wind to which the deployed recovery device is exposed is mainly ground-level wind, often of less forceful magnitude than winds aloft.

As is explained in the FPA, the realization that a recovery device can be ejected harmlessly at a high altitude if it is retained in a compact form and not deployed until descent has progressed to a low altitude can be applied in a very practical way to the recovery of descending rocket components. One approach disclosed in the FPA is to modify a single deployment recovery system so that, when its ejection charge fires at the conclusion of engine burn, what is ejected at high altitude is not an immediately deployed recovery device such as a parachute that opens promptly in the wind, but rather a recovery device such as a bundled parachute that is retained in a compact, non-deployed form until the recovery device and rocket components tethered thereto descend to a low altitude, only a short distance above ground, where the recovery device is permitted to open. By this technique, deployment of the recovery device that was harmlessly ejected by an engine-carried black powder charge at the conclusion of engine burn is delayed until the optimal moment for deployment to take place, namely when only a short descent distance remains to be traversed. Thus, the "descent slowing" action which is initiated when the recovery device deploys, comes into play just when it is needed, and at a time when the deployed recovery device will be subjected to mainly ground level wind that probably will cause only minimal unwanted travel of recoverable rocket components away from the launch site.

Stated in another way, what is provided by one system disclosed in the FPA are the advantages associated with the delayed deployment of a recovery device in dual deployment recovery systems, and yet these advantages are achieved without requiring that the rocket being launched have sufficient thrust and load-carrying capacity to carry aloft the complex apparatus that are commonly associated with the firing of an auxiliary ejection charge in dual deployment recovery systems. Accordingly, delayed recovery device deployment is achieved in a far simpler way than it previously has been achieved.

Delayed deployment recovery systems that take at least one of the forms disclosed in the FPA can add so little weight to a rocket, and can occupy so little space that they are well suited for use with small rockets, even with very small rockets, to help ensure the safe recovery of their components. Moreover, advantages also obtain when a recovery device is retained in a compact form until the time for actual deployment time is at hand, for the compact form of such a device renders it easy to insert into the tubular body of a rocket, and helps to assure that, when the compact recovery device is to be ejected, it does not unfold, unfurl or otherwise behave in a manner that resists or impairs proper ejection.

Disclosed in the provisional applications (i.e., the referenced FPA and SPA) are a variety of forms of band like retainers—elongate band-like devices for encircling and retaining in compact form recovery devices such as streamers and parachutes. These retainers (whether taking the form of thread-like fibers that can be tied in place, or plastic band-like devices that can have one end region inserted through an opening defined near an opposite end region before being drawn up snugly) preferably share the characteristic of being heat-severable—a characteristic that permits retainers to be quickly, simply and easily severed by a localized application of heat energy to release for deployment a recovery device that is held in compact form until the retainer is severed.

Also disclosed in the FPA and SPA are control circuitry and devices for supplying electricity (at a desired time, in response to a received signal or at the expiration of a timed interval) to heating elements that provide localized heating needed to sever the retainers to release recovery devices such as streamers and parachutes for deployment. Introduced by the SPA are heating element modules (i.e., heating elements in a modular form) that plug into jack-like connectors of a control device or that can be coupled by modular connection cables to a control device in a way that facilitates the set-up of a rocket recovery device prior to the launch of a rocket, and that permits one heating element module to be quickly and easily substituted for another when this is desired.

These and other features, and a fuller understanding of the invention may be had by referring to the following description and claims taken in conjunction with the accompanying drawings.

DRAWING DESCRIPTION

In the accompanying drawings:

FIG. 1, labeled PRIOR ART, is diagrammatic depiction of selected stages of a conventional, prior art type of rocket flight that utilizes a single deployment recovery system including a parachute that deploys at a high altitude to lower separated rocket components to ground;

SUMMARY

Figure 1:
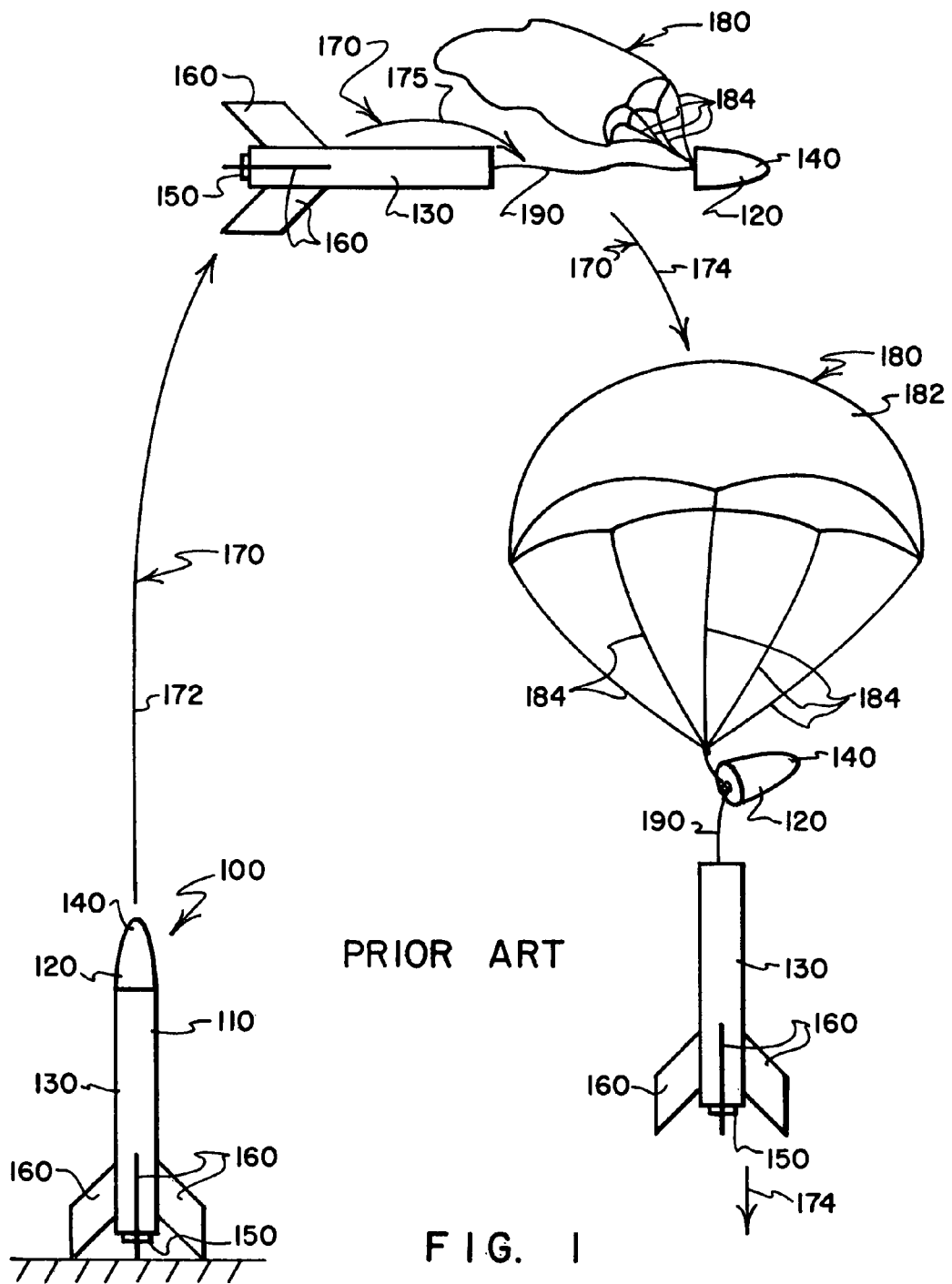

Some embodiments of the invention include an apparatus that can be carried aloft by the launch of a rocket to accompany a recovery device to retain the recovery device in a compact form until it is desired to release the recovery device from the compact form to deploy and slow the descent of components of the rocket, wherein the apparatus includes an elongate heat-severable band-like retainer configured to extend about the recovery device to retain the recovery device in the compact form, an electrically energizable heating element configured to extend along at least a short reach of the elongate band-like retainer, and electrical circuitry adapted to supply electricity to the heating element to heat and sever the retainer reach to release the recovery device from the compact form to deploy and slow the descent of the components of the rocket.

Some embodiments provide deployment control for a parachute-type rocket recovery device adapted to be carried aloft with the recovery device by a launch of the rocket comprising a set of components including a heating element connectable to a heat-severable reach of an elongate retainer configured to extend closely about at least a canopy of the parachute to retain the canopy in a compact form until the retainer reach is severed as the result of electricity being supplied to the heating element to thereby release the parachute canopy to deploy from the compact form to slow the descent of the rocket.

Some embodiments present a control device that is insertable into a model rocket together with a heating element and an elongate retainer for controlling the deployment of a recovery device of the rocket that is carried aloft in a compact form by the rocket to be deployed at an altitude above ground to slow the descent of the rocket, wherein the elongate retainer is configured to extend about and retain the recovery device in the compact form until the retainer is severed to permit the recovery device to deploy from the compact form, wherein the heating element is configured to extend alongside a heat severable portion of the elongate retainer, and wherein the control device is connectable to the heating element to supply electricity to the heating element to cause the heating element to heat-sever the heat severable portion of the retainer to release the recovery device from the compact form to deploy and slow the descent of the model rocket.

Some embodiments provide a deployment control for a parachute-type rocket recovery device comprising an electrical heating element extensible along a heat severable reach of an elongate retainer capable of being wrapped closely about the parachute to retain the parachute in a compact form until the closely wrapped retainer is severed as the result of electricity being supplied to the heating element to heat and sever the heat-severable reach of the retainer to thereby release the parachute for deployment.

Some embodiments simply include a severable parachute retainer formed from an elongate length of material that is capable of forming a loop extending about a parachute to hold the parachute in compact form until a heat severable reach of the loop is severed by heating to thereby release the parachute from being held by the loop in the compact form.

Stated in another way, some embodiments provide an elongate retainer formed primarily of heat severable plastic and configured to be looped around and tightened about a deployable recovery device to retain the recovery device in a non-deployed compact form until a portion of the retainer is severed by a localized application of heat to release the recovery device from the compact form for deployment.

Some embodiments provide a rocket recovery device that can be carried aloft within the body of a rocket and that is attachable to a cord that tethers components of the rocket body that separate after a rocket engine burn carries the rocket aloft, including a deployable parachute folded to form a bundle and being retained in bundle form by a heat meltable cord that, if severed, releases the parachute for deployment, a heating element extending along at least a short reach of the cord, and a control device for supplying electricity to the heating element for heat severing the cord to deploy the parachute to slow descent of the tethered components.

Other embodiments are enumerated in the description and claims that follow.

DETAILED DESCRIPTION

Referring to FIG. 1, an assembled rocket ready for launch is indicated generally by the numeral 100. The rocket 100 includes conventional components (of types well known to those skilled in the art) which provide a tubular upper body section 120 and a tubular lower body section 130 that are releasably connected to form a rocket body 110 having a pointed nose or nosecone 140 at its upper end, and carrying an ignitable engine 150 near its lower end. Fins 160 are connected to the lower body section 130 in a conventional manner to assist in guiding the flight of the rocket 100 once the rocket 100 has been launched by a burn of the engine 150.

Referring still to FIG. 1, when the rocket 100 is launched, it normally will follow a path of travel such as is indicated by the numeral 170, that typically includes a somewhat curved ascending component 172, and a somewhat curved descending component 174. An apogee of the travel path 170 is indicated by the numeral 175.

When the burn of the rocket engine 150 brings the rocket 100 to the flight apogee 175, the firing of a black powder charge (not shown) incorporated in the commercially purchased engine 150 of the rocket 100 causes the upper and lower body sections 120, 130 of the rocket 100 to separate, and causes a recovery device such as a parachute 180 to eject in a manner well known to those skilled in the art. Other forms of recovery devices such as a streamer (that may be included in or may comprise what is indicated at the top of FIG. 1 by the numeral 180) can be used in place of, or in combination with a parachute, as will be readily understood by those skilled in the art.

Once the parachute (and/or other form of recovery device) 180 is ejected, it promptly unfolds (and/or unrolls, or otherwise deploys) in the wind. The depicted deployed parachute 180 has shroud lines 184 that depend from a canopy 182 and connect with a shock cord 190, also known as a "recovery harness," that tethers together the separated components of the rocket 100 which, in the case of the depicted rocket 100, include the upper and lower body sections 120, 130. As is well known to those skilled in the art, the shock cord 190 is connected to the separable components of the rocket 100 at a time prior to launch, and is inserted into an interior compartment (not shown) of the rocket body 110 together with the folded parachute (and/or other form of recovery device) 180 to be carried aloft when the rocket 100 is launched.

As the parachute supported, tethered-together sections 120, 130 of the rocket 100 descend in the manner illustrated in right side portions of FIG. 1, their descent may be caused to differ from the depicted descending travel path component 174 due to the influence of winds aloft. Indeed, as has been pointed out previously, a significant problem often encountered with the parachute supported descent of tethered rocket components is the fact that they and an associated recovery device (e.g., the parachute 180) that supports the tethered components may be engaged by the wind and blown a significant distance away from the launch site.

Eventually the tethered rocket components 120, 130 land. The impact suffered upon landing usually will not cause damage to the components 120, 130 if the parachute 180 has properly deployed to support and slow the descent of the components 120, 130, assuming, of course, that the landing takes place at a suitable ground location rather than in a tree, marsh or swamp, or other unfavorable landing site.

If the launch operator is concerned that the parachute 180 may not render the tethered components 120, 130 sufficiently visible so their descent can be tracked and their recovery assured, he or she may add a streamer (not shown) to the components 120, 130 that are coupled to the shock cord 190 and carried aloft within the body 110 of the rocket 100. The streamer can be ejected together with the parachute 180 at the time of separation of the rocket body components 120, 130, and should unroll or unfold promptly as it is caught by the wind to provide a lengthy, highly visible recovery device that helps to guide recovery efforts.

Figure 2:
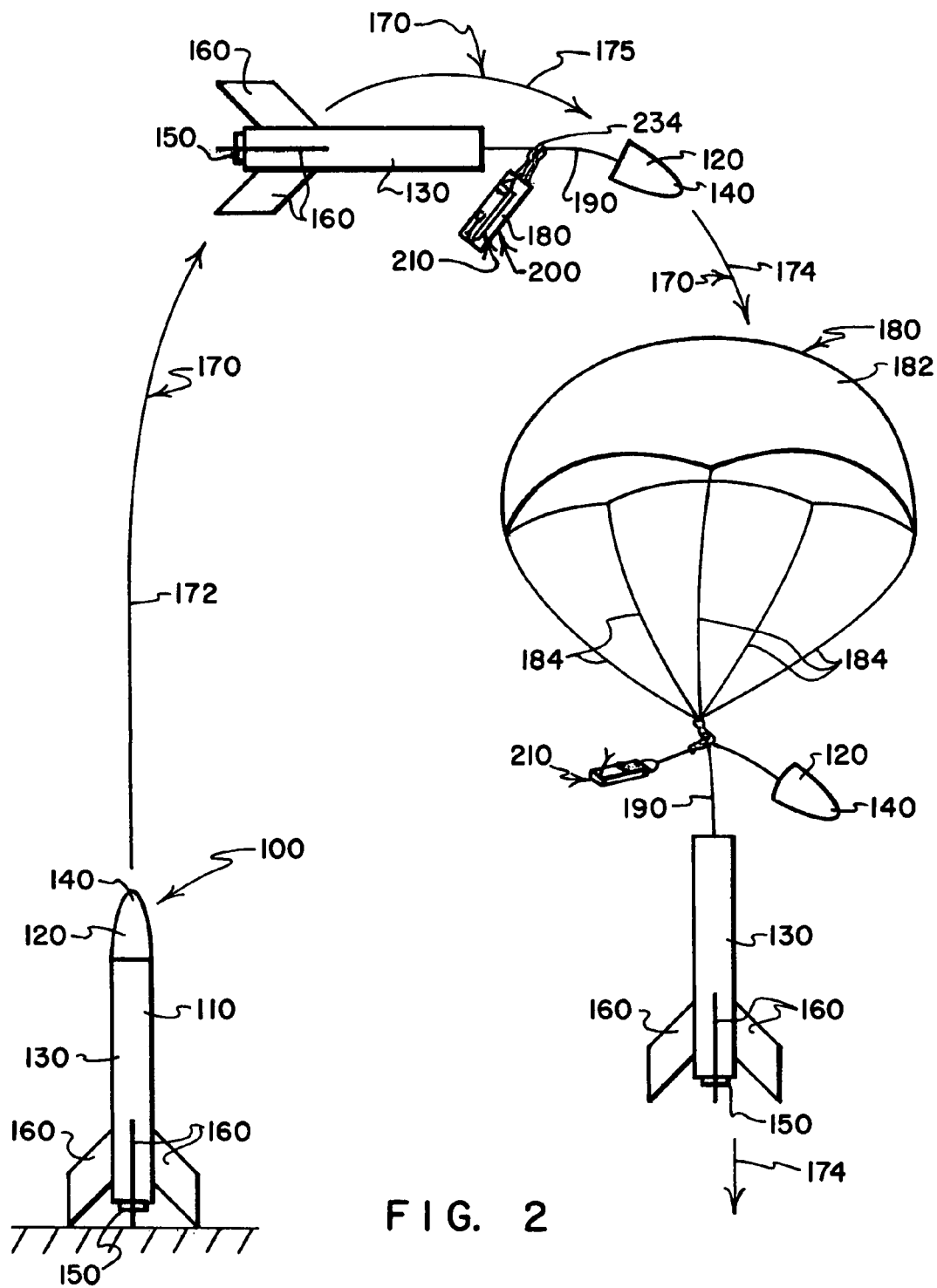
FIG. 2 is a diagrammatic depiction of selected stages of a rocket flight that utilizes a delayed deployment recovery system including a parachute that deploys at a relatively low altitude to lower separated rocket components to ground.
Figure 3:
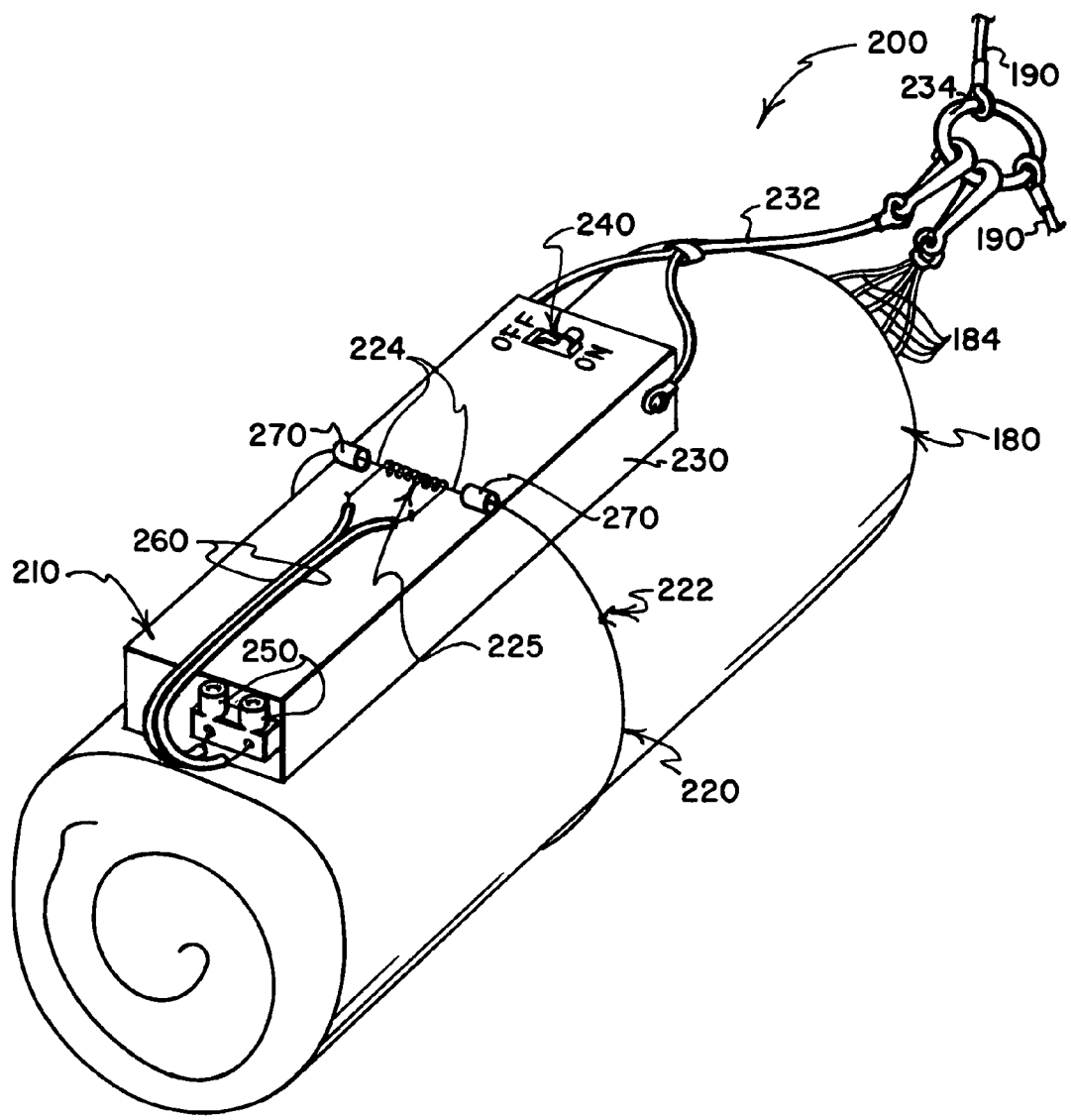
FIG. 3 is a perspective view of a parachute being retained in a compact form by one form of a heat severable retainer, and one form of a control apparatus including a heating element which may be energized to sever the retainer to release the parachute of FIG. 2 for deployment at a desired time.

Referring to FIG. 2, the same rocket 100 is shown being launched along the same travel path 170, but with the parachute 180 being ejected in a compact form, bundle or package 200 (instead of being ejected for immediate deployment as depicted in FIG. 1). Referring to FIG. 3, the package 200 is shown more clearly to include the parachute 180 in a folded (and/or rolled) form. A band-like or cord-like retainer 220 is provided to hold the folded, coiled parachute 180 in the compact form depicted in FIG. 3, and to clamp a control apparatus or control unit 210 in place along a perimeter portion of the folded, rolled parachute 180.

In the form depicted in FIG. 3, the retainer 220 is an elongate band-like or cord-like member comprised of a thin fishing line or cord of approximately four to ten pounds tensile strength (i.e., four to ten pounds test), formed from a heat meltable (i.e., heat severable) plastic such as DuPont Nylon, which is knotted as indicated by the numeral 222 after being drawn tightly about a combination of the parachute 180 and the control unit 210.

One element of the control unit 210 is a heating element 225 which is stationed adjacent a short reach 224 of the retainer 220. The heating element 225 may take any of a variety of forms well known to those skilled in the art, for example, a small coil of thin, electrically resistant nichrome wire as depicted in the drawings (or, more simply, a relatively straight reach of nichrome wire, not shown) that extends about or along the short reach 224 of the retainer 220 and becomes hot when electricity is supplied to its opposite ends, and which, when heated to a hot state, will locally heat, melt and sever the short reach 224 of the retainer 220 which resides adjacent to, or in close proximity to, the heating element 225 to thereby release the parachute 180 from its tightly folded (and/or rolled) compact form so it will unfold and deploy in the wind, as is depicted on the right side of FIG. 2 (or that releases for deployment some other form of recovery device from the compact form in which it is retained by the retainer 220).

Referring to FIG. 3, the control unit 210 includes a box-like housing or container 230 that is provided with a tether cord 232 that can be connected to a ring 234 of the shock cord 190. The housing 230 supports an externally accessible on-off switch 240 for arming the control unit 210, and a pair of external terminals 250 to which the copper wires within a pair of insulated wire leads 260 are connected that supply electricity from the terminals 250 to the heating element 225.

Contained within the interior of the control unit container 230 is a battery and other circuitry, as will be explained shortly in conjunction with FIG. 4. The circuitry of the control unit 210 may be relatively complex (for example, it may include a conventional radio or optical signal receiver, not shown, that can respond to a conventional, remotely located radio or optical signal transmitter, not shown, that may perhaps be held in the hand of an operator who wants to control precisely when the parachute 180 is released to deploy), or may be quite simple and straightforward, such as the interval-timer-controlled circuit depicted in FIG. 4.

Referring still to FIG. 3, a pair of aligned, tubular guide members 270 are supported by the housing 230 at locations on opposite sides of the short reach 224 of the retainer 220 (i.e., on opposite sides of the heating element coil 225). The retainer 220 may extend through the guide members 270 as depicted so the cord material comprising the retainer 220 can better grip the control unit 210 to hold it in place alongside a perimeter portion of the coiled parachute 180. When the retainer 220 eventually is severed by a localized application of heat to permit deployment of the parachute 180, the tether cord 232 which connects with the ring 234 on the shock cord 190 will ensure that the control unit 210 descends in unison with other parachute-supported components, as is depicted in a lower right side portion of FIG. 2.

Figure 4:
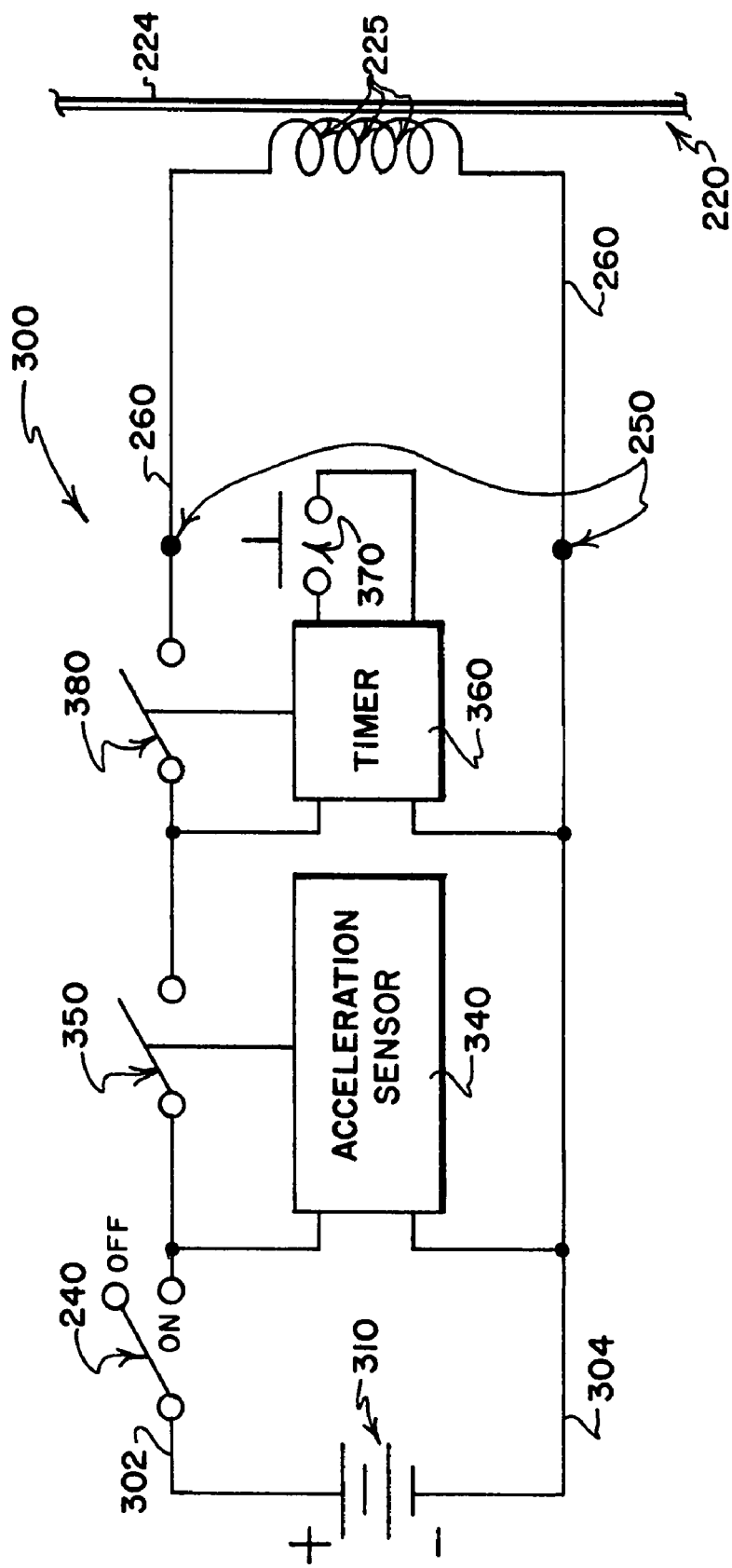
FIG. 4 is a schematic diagram showing one possible arrangement of circuit components that may be used in the control apparatus of FIG. 3.

Referring to FIG. 4, a circuit 300 of the control unit 210 is shown, some of the components of which have already been introduced in the above discussion. Electricity is supplied by leads 302, 304 from a battery 310 to other components of the circuit 300 including a conventional, commercially purchased acceleration sensor 340 when the off/on arming switch 240 (shown in FIGS. 3 and 4) is set to the "on" position. When the acceleration sensor 340 senses acceleration due to liftoff of the rocket 100, the acceleration sensor 340 operates a switch 350 to supply electricity to a conventional, commercially purchased interval timer 360. When a time interval set on the timer 360 (it may be set by use of a switch 370 or by some other conventional form of input device) expires, the timer 360 then operates a switch 380 to supply electricity through the wire leads 260 to the heating element 225.

In operation, after a desired time interval has been set on the interval timer 360, the arming switch 240 is set to the "on" position, and the rocket 100 is ready for launch. When the rocket 100 is launched by igniting the engine 150, the acceleration sensor 340 detects liftoff acceleration and immediately operates the switch 350 to energize the interval timer 360. The time interval set on the timer 360 is a few seconds shorter than the total time required for the launched rocket 100 to travel the full length of the travel path 170 from launch through apogee to the landing of the rocket's components—a time 1) that may be calculated by taking into account information provided by the supplier of the engine 150; information about particular rocket being flown, and information about the atmosphere in which the flight is to take place, etc., or 2) that may be approximated with a reasonable degree of accuracy after test flying the rocket 100 and timing its performance.

When the time interval set on the timer 360 expires, the timer 360 operates the switch 380 to supply electricity to the heating element 225. And, when the heating element 225 becomes hot, it melts and severs the adjacent reach 224 of the band-like or cord-like retainer 220 to thereby release the parachute 180 for immediate deployment at a time when components of the rocket 110 are a short time (perhaps only about twenty seconds or thereabouts) away from landing at a location that hopefully is only a short distance away from the site where the rocket 100 was launched.

Before the rocket 100 is launched, the operator sets a suitable time interval on the interval timer 360—an interval that is expected to cause recovery device deployment when the descending rocket components are a desired height above ground level so the parachute 180 will satisfactorily slow the final few moments of descent to ground. A desirable height above ground selected for the parachute 180 to deploy usually is within the range of about 400 feet to about 1000 feet depending on the rocket being flown and atmospheric conditions affecting flight, but the preferences of the operator may dictate a different deployment height. With the benefit of a few tests to provide needed experience, the operator will soon become proficient in achieving deployment of the parachute 180 at desired above-ground heights.

Figure 5:
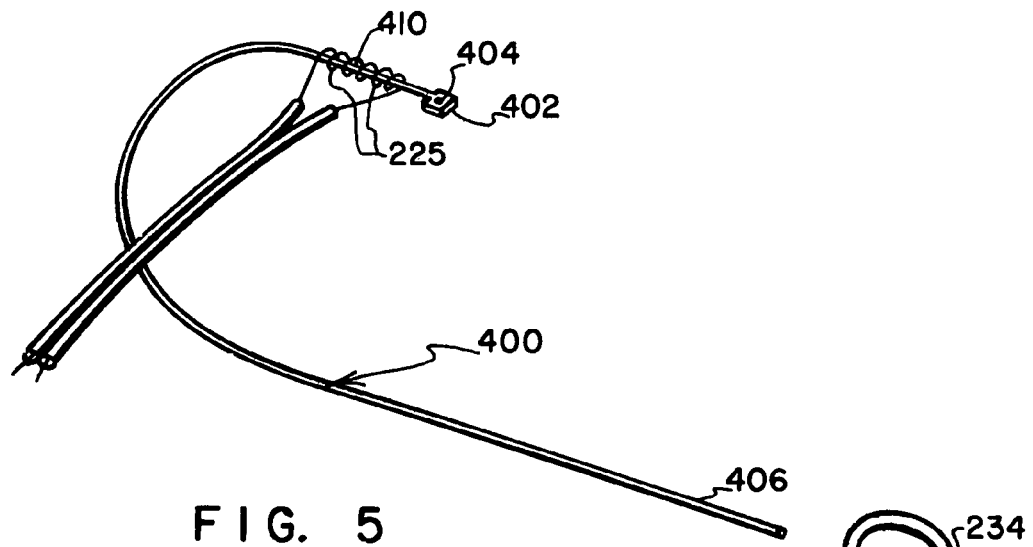
FIG. 5 is a perspective view of another form of heat severable retainer that can be used to retain a recovery device in compact form for deployment at a desired time when an accompanying heating element is energized to sever the retainer.

Referring to FIG. 5, an alternate form of a band-like or cord-like retainer is indicated by the numeral 400. The retainer 400 preferably takes the form of a conventional cable-tie type of band having a relatively large end region 402 surrounding an opening 404 through which an opposite end region 406 of the retainer 400 can be inserted, as depicted in FIG. 6.

Figure 6:
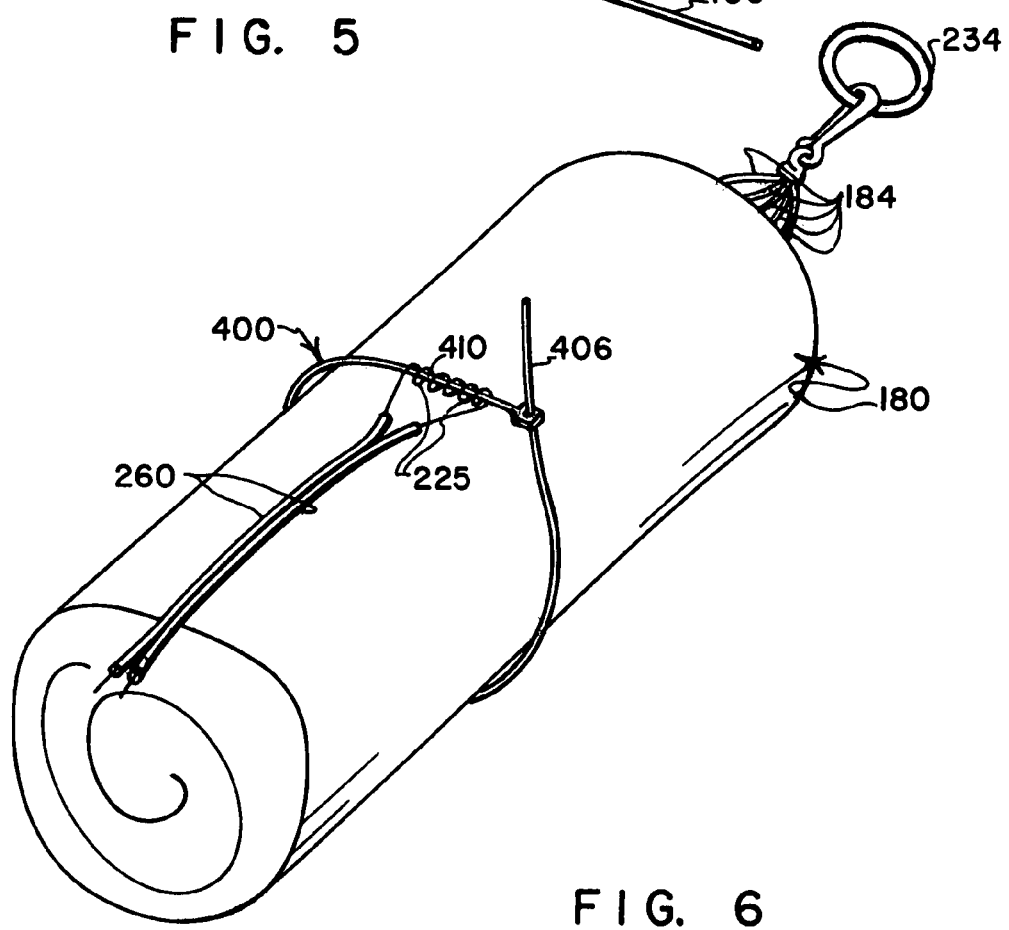
FIG. 6 is a perspective view showing how the heat severable retainer of FIG. 5 may be employed to retain a recovery device in compact form until the retainer is severed to release the recovery device for deployment.

Before the rocket 100 is launched, the folded and/or rolled parachute 180 and the control unit 210 preferably are arranged substantially as depicted in FIG. 3 so one or the other of the retainers 220, 400 can be looped around a combination of the parachute 180 and the control unit 210, whereafter the loop is tightened and knotted (as indicated by the numeral 222 in FIG. 3), or connected (as depicted in FIG. 6). When the rocket 100 is launched, the acceleration sensor 230 senses liftoff acceleration and operation of the circuit 300 depicted in FIG. 4 proceeds, ending with energization of the heating element 225 which severs an associated one of the retainers 220 or 400 to release and deploy the parachute 180.

Figure 16:
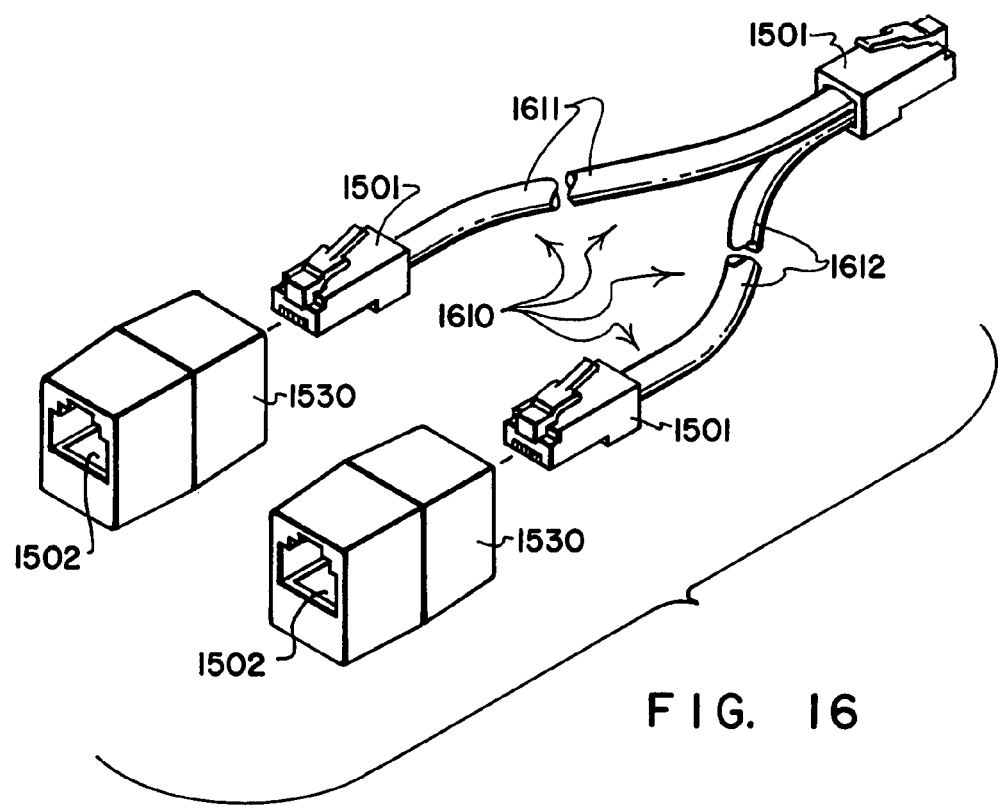
FIG. 16 is a perspective view similar to FIG. 15 showing an optional dual-branch extension cord and couplers that can be substituted for the extension cord and couplers of FIG. 15.
Figure 17:
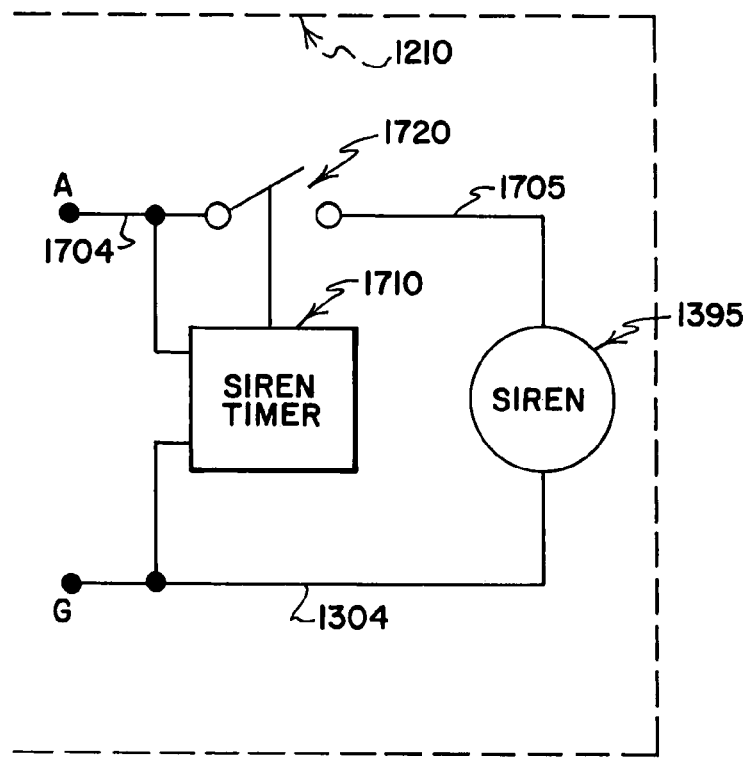
FIG. 17 is a schematic diagram showing an optional timer and siren that can be added to the control apparatus circuitry of FIG. 14; and, FIG. 18 is a schematic diagram showing an optional auxiliary timer that can be added to the control apparatus circuitry of FIG. 14.
Figure 18:
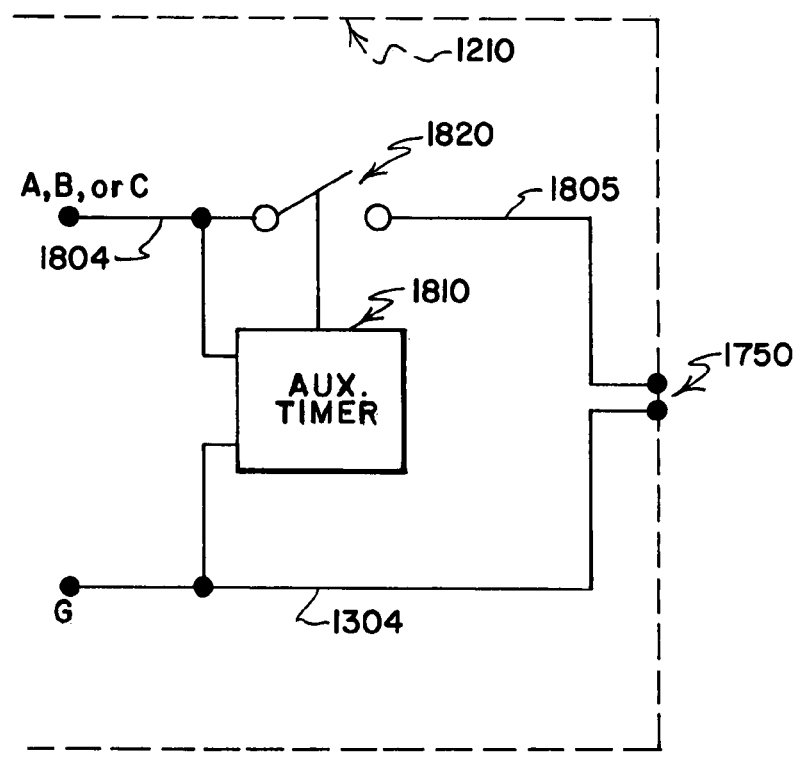

An ongoing program of development has resulted in a number of advancements, enhancements and optional features that are discussed in the paragraphs that follow, including an enhanced control apparatus or control unit 1210 (see FIGS. 7-10) which can be substituted for the previously described control apparatus or control unit 210, a plug-in heating element module 1700 (see FIGS. 7-10) that carries and protectively encloses a heating element 1225 (see FIG. 9) which can be used in place of the previously described heating element 225, an alternate retainer 1220 that can be used in place of one of the previously described retainers 220, 400, an enhanced circuit 1300 (see FIG. 14) that can be utilized by the control unit 1210 and/or substituted for the circuit 300, and optional features such as the extension cords 1510, 1610 (see FIGS. 15-16) and circuitry enhancements (see FIGS. 17 and 18).

Figure 8:
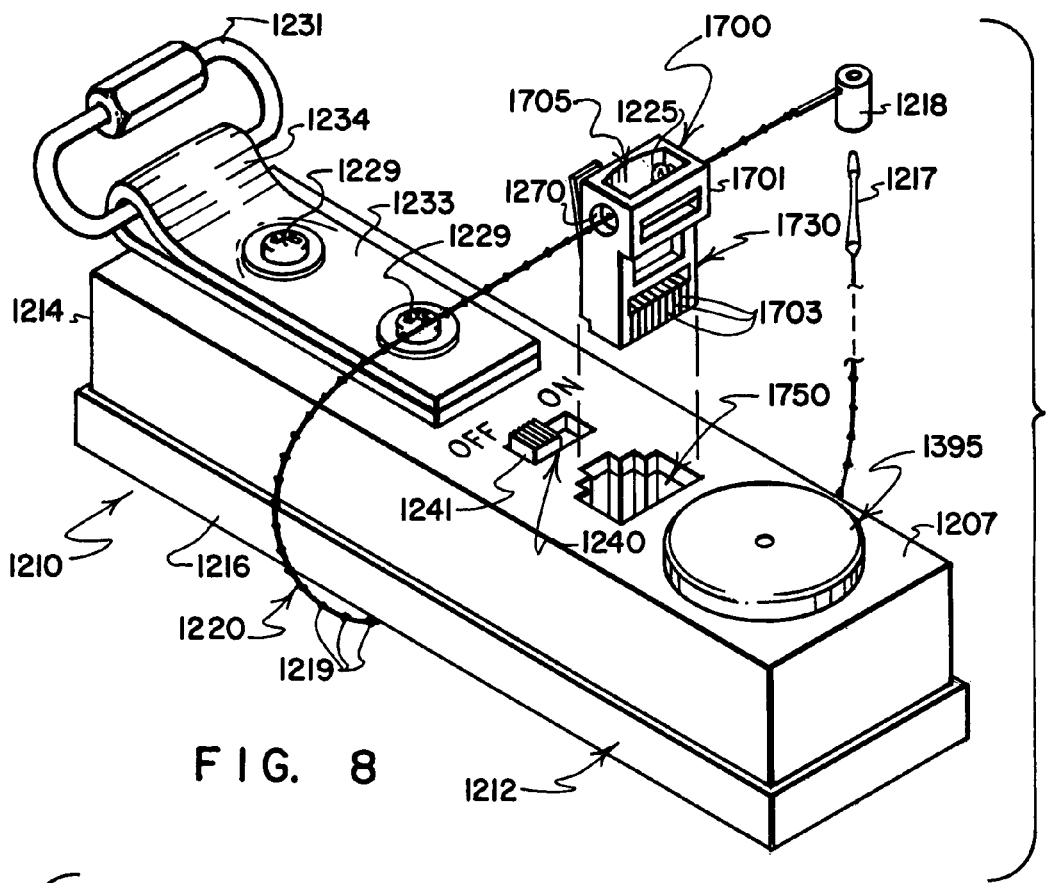
FIG. 8 is a perspective view on an enlarged scale showing the control apparatus, the plug-in heating element module and the heat severable retainer of FIG. 7.

Referring to FIG. 8, in one preferred form the control unit 1210 includes a female electrical connector or jack 1750, and the heating element module 1700 includes a male electrical connector or plug 1730 that enables the heating element module 1700 to be removably "plugged into" the jack 1750 of the control unit 1210.

Although the plug 1730 and jack 1750 are depicted as taking the form of commercially available RJ45-type plugs and jacks (that commonly are used with low voltage plural conductor cables to connect communication, data and computer networking equipment including a variety of business and residential telephone equipment), the heating element module 1700 and the control unit 1210 can be provided with other types of plug-compatible male and female connectors, as those who skilled in the art will readily appreciate.

An advantage that obtains from the use of RJ45-type plugs and jacks is that much of the structure that comprises one of the heating element modules 1700 can be provided by the plastic housing and wire-like conductors that comprise a standard RJ45-type telephone, data and computer networking plug—which means that relatively little else (typically a pair of conductive posts 1711 and the heating element 1225 depicted in FIGS. 9 and 11-13) is needed to form one of the heating element modules 1700.

By using a low-cost RJ45-type computer networking plug to form much of the structure the heating element module 1700, it is possible to provide heating element modules 1700 so inexpensively that these modules essentially become low cost "throw away" items that can be discarded when their fragile heating elements 1225 break or burn out. Although the heating elements 1225 can wear out after a single use to sever one or the retainers 220, 400, 1220, or after only a few such uses, there are times when one of the heating elements 1225 will retain its operability through a dozen or more of such uses. Nonetheless, the heating elements 1225 usually are quite delicate, can become embrittled with repeated use, and sometimes break when brought into contact with one of the retainers 220, 400, 1220.

The number of uses that can be made of a particular heating element 1225 can depend on its design. A more robust design usually can be relied on to operate a multiplicity of times, but may fail to operate at all in cold weather. A more fragile design may operate quite reliably in a wide range of weather conditions, but may expire after a single use.

A further advantage that obtains when an RJ45-type plug is used to house a heating element 1225 as depicted in FIGS. 9 and 11-13 to form one of the heating element modules 1700 pertains to safety. Because the plastic material of an RJ45-type plug can be used to house and protectively enclose the heating element 1225, the plastic material can sufficiently shield the heating element 1225 from contact to prevent burns to the skin and to minimize the possibility that fabric or other flammable material will contact the heating element and ignite.

Figure 15:
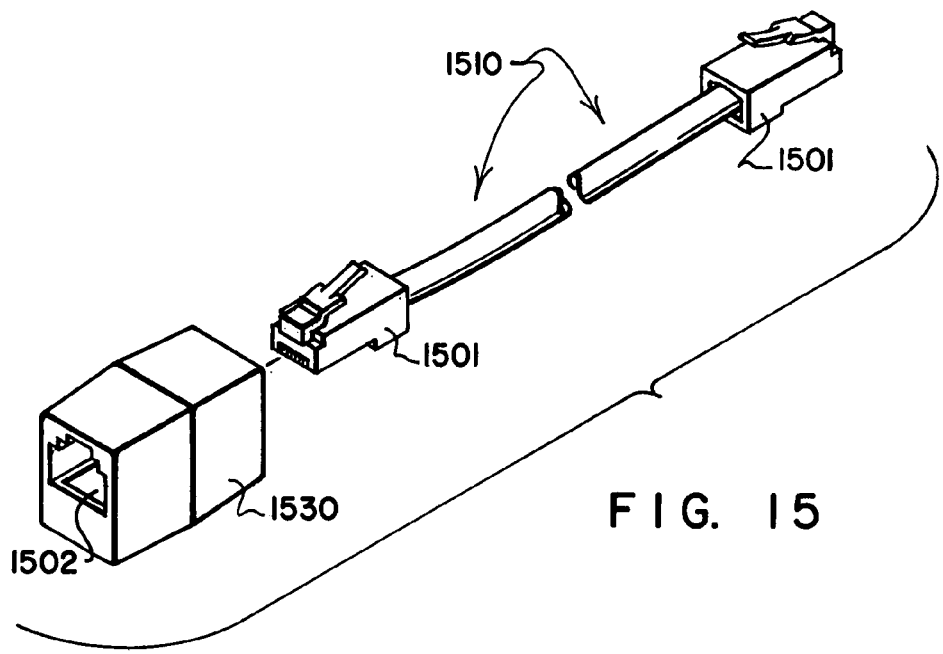
FIG. 15 is a perspective view showing an optional single-branch extension cord and coupler that can be used with the control apparatus and plug-in heating element module shown in FIGS. 7, 8 and 10.

Yet another advantage that obtains from the use of RJ45-type plugs and jacks to provide the heating element module 1700 and the control unit jack 1750 is that, if it is desired to station the heating element module 1700 at a location spaced a short distance from the control unit 1210, standard, readily available, RJ45-type extender components can be used to provide the desired spacing. In FIG. 15, for example, a simple single-branch RJ45-type extension cord 1510 is shown which carries standard RJ45-type plugs 1501 at its opposite ends, together with a standard coupler 1530 which has standard RJ45-type jacks 1502 at its opposite ends. The extension cord 1510 and the coupler 1530 can be used to station one of the heating element modules 1700 at a location spaced from the control unit 1210 by plugging the module 1700 into one of the two identical jacks 1502 of the coupler 1530, with one of the plugs 1501 of the extension cord 1510 being inserted into the other of the jacks 1502 of the coupler 1530, and with the other of the plugs 1501 of the extension cord 1510 being inserted into the jack 1750 of the control unit 1210.

Likewise, referring to FIG. 16, a dual-branch extension cord or splitter cord 1610 is shown which has branches 1611, 1612 that each carry a separate RJ45-type plug 1501 at one of their ends, and that have their other ends connected to a third RJ45-type plug 1501. Either of the branches 1611, 1612 can be used together with one of the depicted couplers 1530 to operate one of the heating element modules 1700 at a location spaced a short distance from the control unit 1210, with the other of the two branches 1611, 1612 being used together with the other of the depicted couplers 1530 to operate another of the heating element modules 1700, or to operate a different form of recovery aid such as an audible signal generator (not shown) or a visual signal generator (not shown) which the control unit 1210 can cause to operate at the same time as, or at a time different from when the heating element module 1700 is energized to sever one of the elongate retainers 220, 400, 1220.

Just as the control unit 1210 can be used with the single-branch extension cord 1510 of FIG. 15, or with one of the branches of the dual-branch extension cord 1610 of FIG. 16 to energize one of the heating element modules 1700 at a desired time, or at a desired interval of time after a sensed condition such as acceleration or deceleration, or in response to a remote signal, so, too, the control unit 1210 can be used with the other of the branches of the dual-branch extension cord 1610 to energize or operate another heating element module 1700 or another device at a desired time, or at a desired interval of time after a sensed condition, or in response to a remote signal.

Returning to a discussion of what is depicted in FIGS. 7-10, a basic function of the enhanced control unit 1210 is to supply electrical current at an appropriate time, and for a proper length of time, to cause the heating element 1225 of the heating element module 1700 to glow at a sufficiently hot temperature to heat-sever an adjacent reach of a cord-like or band-like elongate retainer (such as the fishing line type retainer 220 shown in FIGS. 3 and 4, the cable-tie type of retainer shown in FIGS. 5 and 6, the new form of retainer 1220 shown in FIGS. 7-10, or some other form of heat-severable retainer) to thereby permit a recovery device (such as the bundled, folded and/or rolled parachute 180 shown in FIGS. 2, 3, 6 and 7) to deploy. Severing one of the elongate retainers 220, 400, 1220 that is tightly wrapped about a bundled parachute 180 will permit the material of the parachute 180 to release and expand from its compressively bundled form so that, when the canopy 182 of the parachute 180 is caught by the wind, it will open as depicted in FIG. 2 to slow the descent and landing speed of such components as are supported by the parachute during a final portion of their descent to ground.

Figure 7:
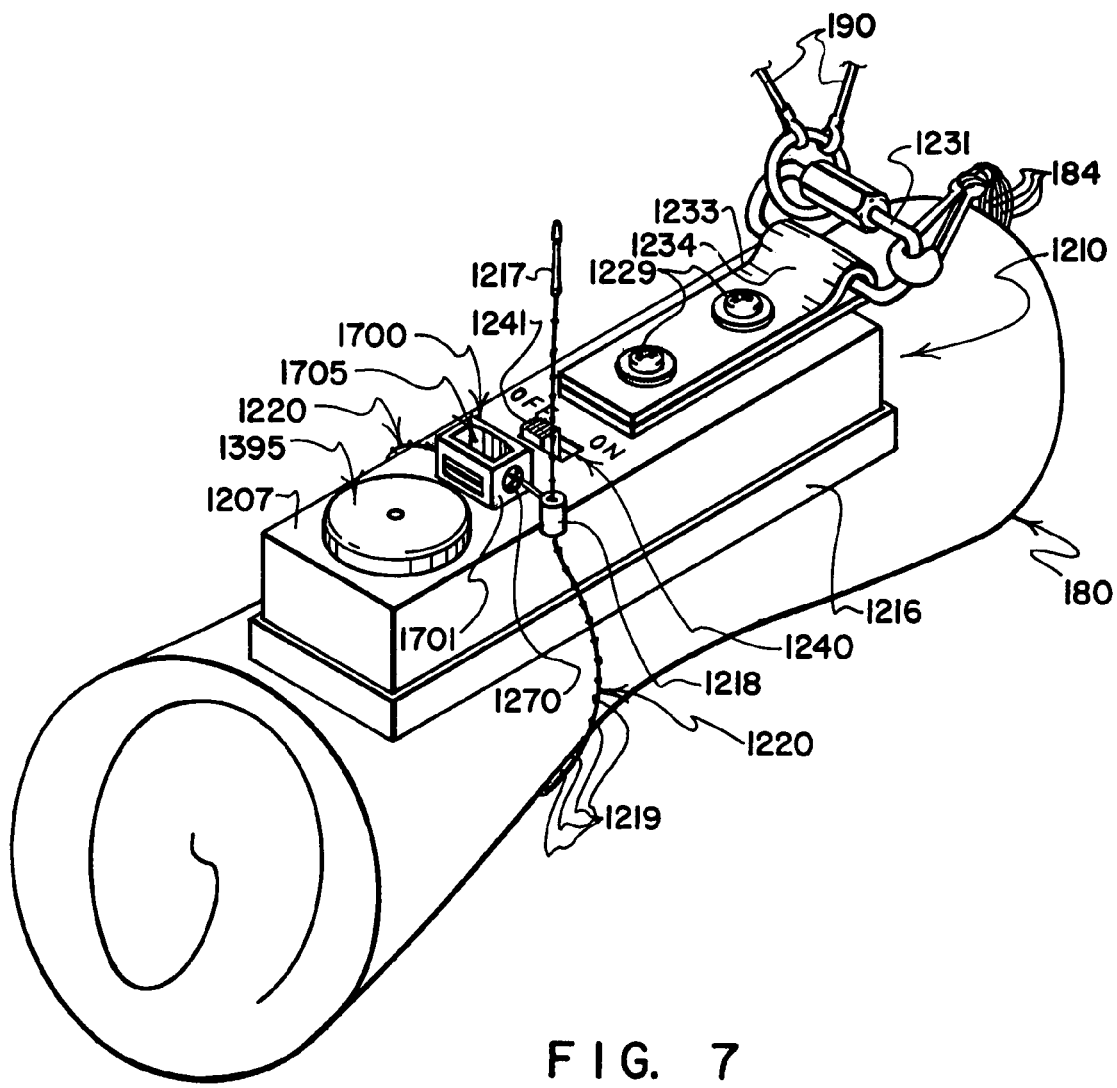
FIG. 7 is a perspective view similar to FIG. 3 of a parachute being retained in a compact form by yet another alternate form of heat severable retainer, and showing an alternate form of control apparatus having a plug-in type of heating element module that can be energized to sever the retainer to release the parachute for deployment.
Figure 9:
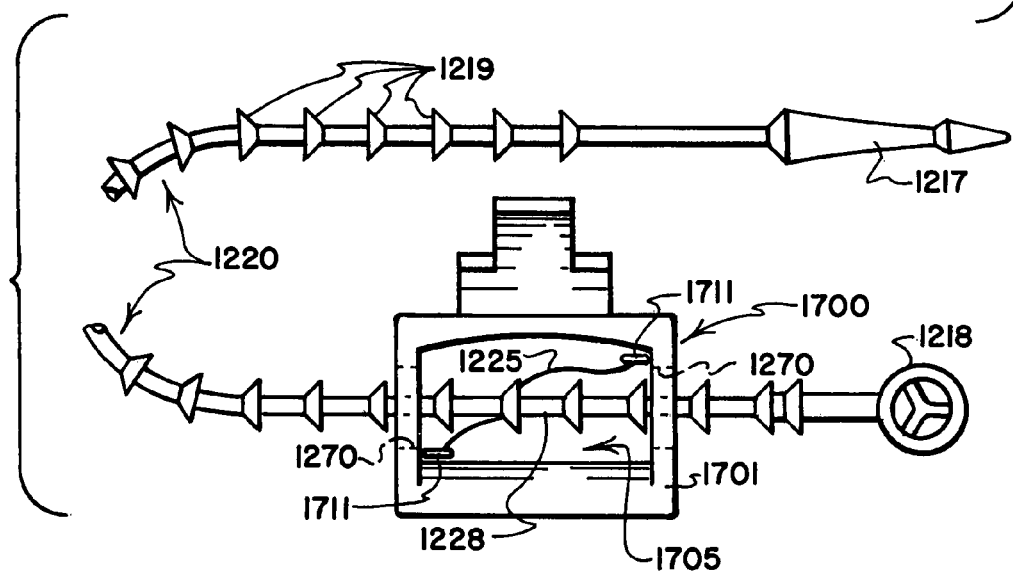
FIG. 9 is a top view, on an enlarged scale, showing the plug-in heating element module and the heat severable retainer of FIGS. 7 and 8.
Figure 10:
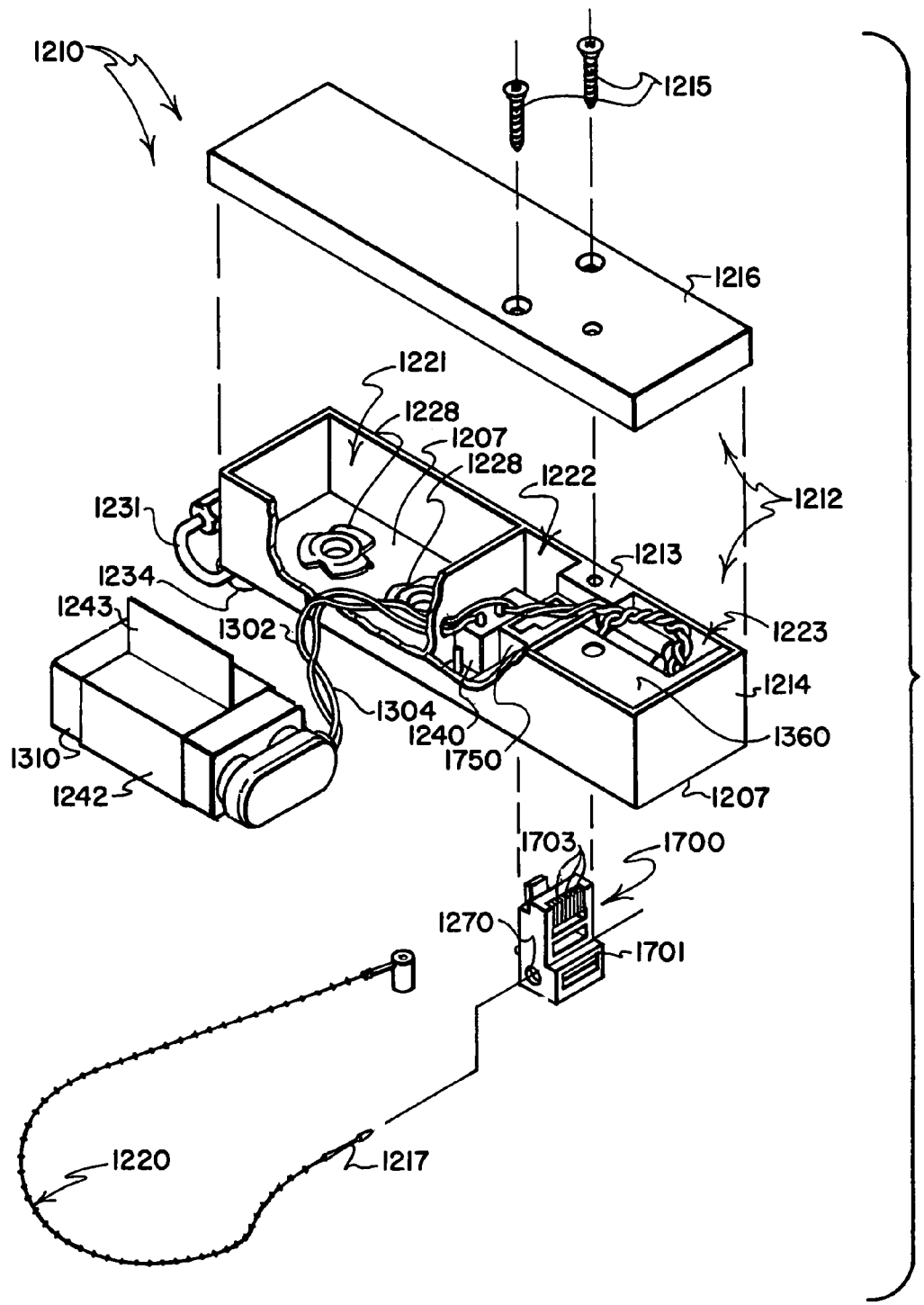
FIG. 10 is an exploded perspective view showing selected components of the control apparatus, the plug-in heating element module and the heat severable retainer of FIGS. 7 and 8.

Referring to FIGS. 7, 9 and 10, the enhanced control unit 1210 has a protective outer enclosure 1212 defined by a generally rectangular base 1214 and a removable cover 1216. Referring to FIG. 10, a pair of screws 1215 are received in holes formed through the cover 1216, and are threaded into relatively thick sidewall portions of the base 1214, one of which is indicated by the numeral 1213. Other walls of the base 1214 cooperate with a bottom wall 1207 of the base 1214 to divide the interior of the base 1214 into three compartments 1221, 1222 and 1223.

Figure 14:
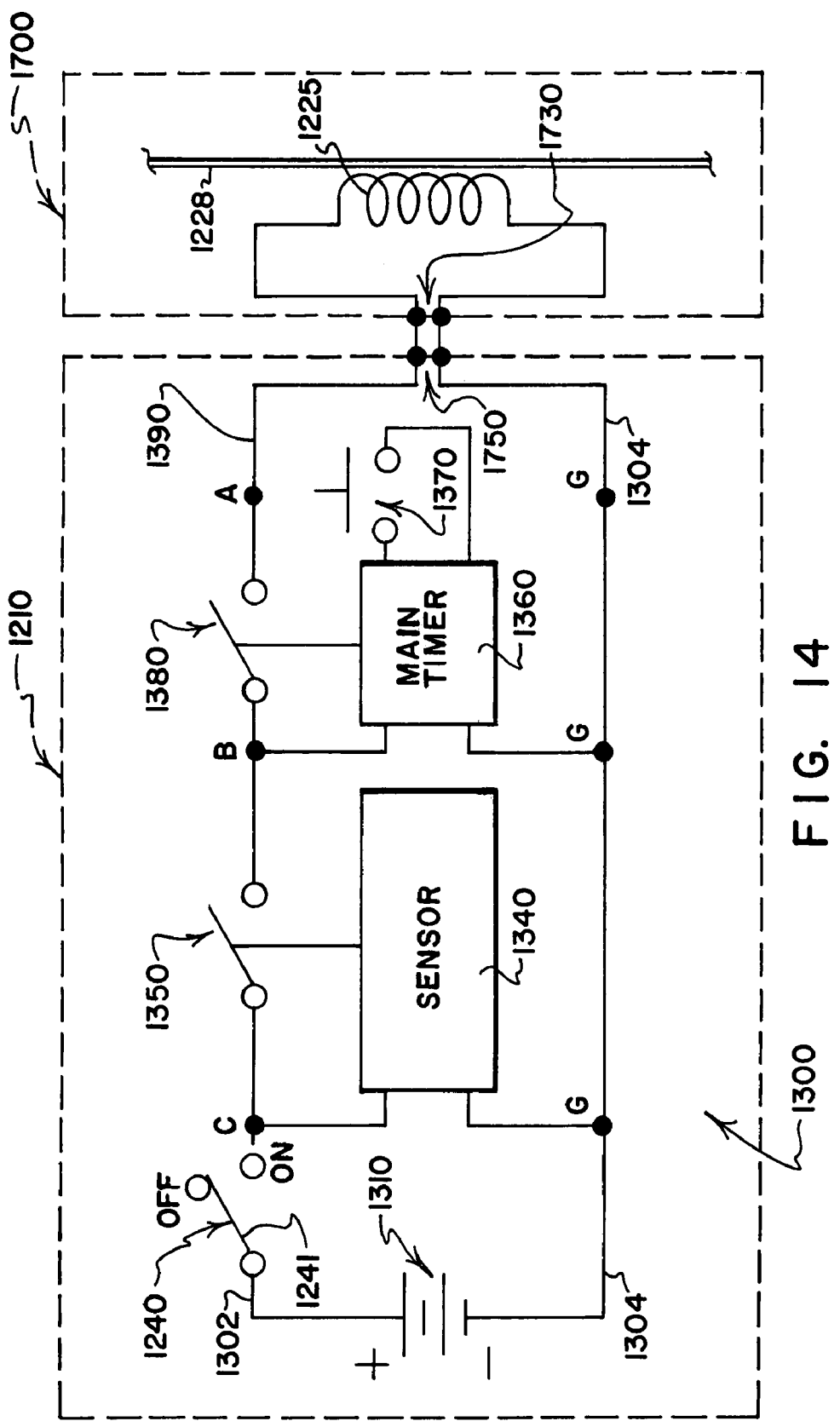
FIG. 14 is a schematic diagram similar to FIG. 4 showing one possible arrangement of circuit components that may be used in the control apparatus of FIGS. 7, 8 and 10.

Referring still to FIG. 10, the compartment 1221 is a battery compartment that is sized to receive a conventional, commercially available 9-volt battery 1310 (or other suitable battery) which supplies current through wires 1302, 1304 to other circuitry components. The compartment 1222 houses portions of an off-on switch 1240 and the RJ45-type jack 1750, interior portions of which are visible in FIG. 10, and other portions of which are visible in FIGS. 7 and 8. The compartment 1223 houses other elements of a suitable control unit circuit, such as the circuit 1300 which is shown in FIG. 14, and perhaps other optional components such as the sound generator 1395 (or a flashing light or other form of visual signal generator, not shown) that can be seen in FIGS. 7, 9 and 10 which may provide a beeping noise, a siren sound, or other audible signal to assist when efforts are underway to locate a downed rocket that may have landed in tall grass, in trees, or among obstacles of other types that block the downed rocket from view.

Referring to FIG. 10, the portion of the bottom wall 1207 that closes one side of the battery compartment 1221 carries two threaded metal inserts 1228. Two screws 1229 best seen in FIG. 10, extend through a mounting strap 1233 and thread into the metal inserts 1228 to securely connect the mounting strap 1233 to the base 1214. The strap 1233 defines a loop 1234 that carries a sturdy, oblong coupler 1231 which is positioned by the strap loop 1234 to extend beyond one end of the rectangular enclosure 1212 of the control unit 1210. The coupler 1231 is a standard item available in hardware stores, and it can be used (for example, in place of the previously described ring 234, shown in FIG. 3) to securely connect the control unit 1210 to the shroud lines 184 of the parachute 180, and to the shock cord 190 of the rocket 100.

To facilitate insertion of the battery 1310 into, and removal of the battery 1310 from the battery compartment 1221, it is preferred that the battery 1310 be loosely wrapped by a band 1242 of thin cloth material that defines a loose tab 1243 of material which can be grasped when the battery 1310 is to be installed into and removed from the battery compartment 1221, and which can be folded against one side of the battery 1310 when the cover 1216 is to be installed on the base 1214.

Referring to FIGS. 7 and 8, it will be seen that the off-on switch 1240 opens through the bottom wall 1207 at a protected location between where the mounting strap 1233 connects to the bottom wall 1207, and where the jack 1750 is accessible through the bottom wall 1207 to receive the plug-in heating element module 1700. At this protected location, a slide 1241 of the switch 1240 is unlikely to be accidentally engaged and caused to slide from one of the "off" and "on" positions to which it has been deliberately moved. Moving the slide 1241 to the "on" position arms the control unit 1210, readying its circuitry to energize one of the heating element modules 1700 (which has been plugged into the jack 1750 of the control unit 1210, or into one of the couplers 1530 that is electrically connected to the control unit jack 1750 by one of the extension cords 1510, 1610 depicted in FIGS. 15 and 16, respectively).

If the control unit 1210 is provided with the sound generating component 1395 (shown physically in FIGS. 7 and 8, and shown schematically in FIG. 17) for producing an audible signal such as a siren or a repetitive beeping noise to aid in locating a downed rocket, the sound generating component 1395 is preferably housed within the third compartment 1223 (FIG. 10) of the base 1214, and preferably opens through the bottom wall 1207 (FIGS. 7 and 8) near the end of the base 1214 opposite from the end where the coupler 1231 is supported by the strap 1233.

Although the plug-in heating element module 1700 disclosed herein may take a wide variety of forms, a simple and inexpensive way to form heating element module 1700 is illustrated in FIG. 9 where an inexpensive RJ45-type plug 1501 (the same type of plug that is crimped in place at the ends of the extension cords 1510, 1610 shown in FIGS. 15 and 16) is employed to support, protectively house, and transmit electricity to the heating element 1225 of the circuit 1300 shown in FIG. 14. Referring to FIG. 9, the heating element module 1700 has a housing 1701 molded from transparent plastic material which, near one end, includes the plug formation 1730 which carries an array of side-by-side wire-like contacts 1703 that are arranged to be engaged (when the plug 1730 of the module 1700 is inserted into the jack 1750 of the control unit 1210) by a corresponding array of side-by-side contacts (not shown) which are carried interiorly of the jack 1750 of the control unit 1210.

Referring to FIG. 9, the molded housing 1701 of the plug 1501 that forms a part of the heating element module 1700 defines a generally rectangular chamber 1705 interiorly of an end region of the housing 1701 opposite from the end region of the housing 1701 that carries the contacts 1703. The chamber 1705 is sized and configured to normally receive and to be crimped in place on an end of a plural-conductor cable of the standard type utilized by the extension cords 1510, 1610 of FIGS. 15, 16. When crimped in place on a cable such as forms the extension cords 1510, 1610 shown in FIGS. 15 and 16, the wire-like contacts 1703 of the plug 1501 make electrical connection with the various conductors of the cable on which the plug 1501 is installed.

Instead of installing a plural-conductor cable in the generally rectangular chamber 1705 of the housing 1701 shown in FIGS. 9 and 11-13, a pair of electrically conductive posts 1711 are installed in the chamber 1705 near opposite corners thereof. The posts 1711 are connected by wires (not shown) that extend through the housing 1701 to selected ones of the wire-like contacts 1703 (FIG. 8) so that, electricity can be delivered from the contacts 1703 to the posts 1711. Strung diagonally through the chamber 1705 between and electrically connecting the posts 1711 is the heating element 1225. As was the case with the previously described heating element 225, the heating element 1225 preferably is formed from nichrome wire capable of glowing at an elevated temperature sufficient to heat-sever a reach of a retainer such as the fishing-line type retainer 220 shown in FIGS. 3 and 10, the cable tie type retainer 400 shown in FIGS. 5 and 6, or the new cable tie type of retainer 1220 which is depicted in FIGS. 7-10.

To aid in positioning a heat-severable retainer such as one of the retainers 220, 400, 1220 adjacent or in engagement with the heating element 1225, holes 1270 are provided through opposite sides of the housing 1701 of the heating element module 1700, as can be seen in FIGS. 7-10. Each of the holes 1270 is situated relatively near to a separate one of the posts 1711 to enable the holes 1270 to receive and guide a reach of one of the retainers 220, 400, 1220 (such as the reach 1228 of the retainer 1220 shown in FIGS. 9 and 13) along substantially a straight path through the holes 1270 and through the chamber 1705 sufficiently near to the heating element 1225 to be heat severed with the heating element 1225 is electrically energized to glow to a sufficiently hot temperature to melt the material from which the retainer 220, 400, 1220 is formed.

Suitable heat severable material from which the retainers 220, 400, 1220 typically are formed is Nylon having a melting point of between about 450 and about 500 degrees Fahrenheit. A material from which the retainer 220 can be formed is Nylon monofilament fishing line of about 4 to about 15 pound tensile strength test. The retainers 400, 1200 can be formed from commercially available cable ties that often are found to exhibit a tensile strength of about 18 pounds. Other heat severable material, and other commercially available cable-tie type products that can be used to form suitable retainers, as will be apparent to those who are skilled in the art.

Referring to FIGS. 7-9, the heat severable retainer 1220 (available at McMasterCarr.com under the product designation 7189K12) has a pointed formation 1217 and a tubular sleeve 1218 at its opposite ends, and bead formations 1219 at spaced locations therebetween. The pointed formation 1217 and the bead formations 1219 are configured to be inserted through the sleeve 1218, but the bead formations 1219 cannot be withdrawn back through the sleeve 1218 once they have been inserted therethrough, as is well understood by those who are skilled in the art. This characteristic of the retainer 1220 renders it easy to install about the folded and/or rolled parachute 180 to hold the parachute 180 in compact form until the heating element module 1700 severs the retainer 1220 thereby permitting the parachute 180 to deploy in the wind.

Figure 11:
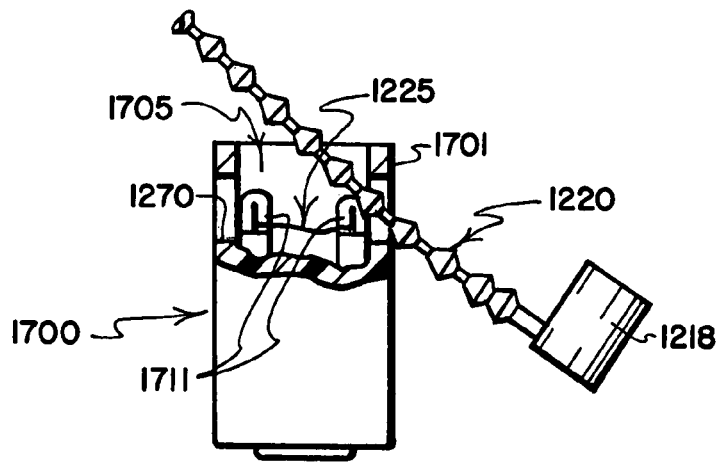
FIG. 11 is a side view of the plug-in heating element module with a portion of the heat severable retainer inserted through one side opening of the module, with a portion of the module broken away to display interior features.
Figure 12:
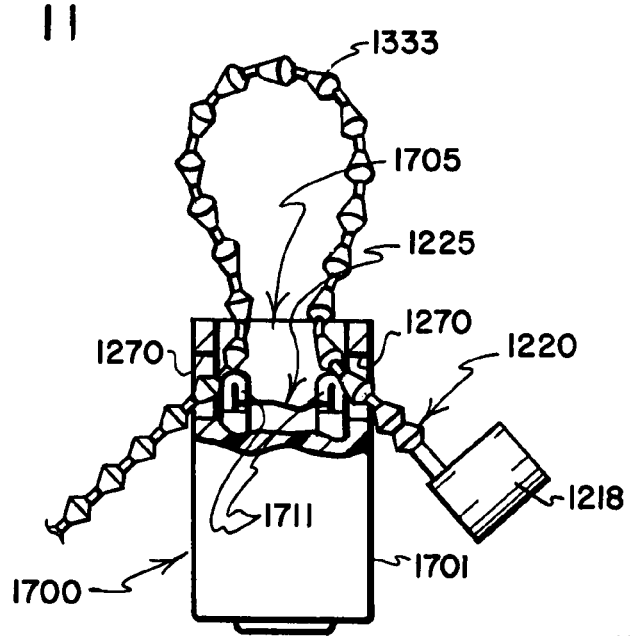
FIG. 12 is a side view similar to FIG. 11 with the heat severable retainer forming a loop between locations where a depicted portion of the retainer extends through opposite side openings of the module.
Figure 13:
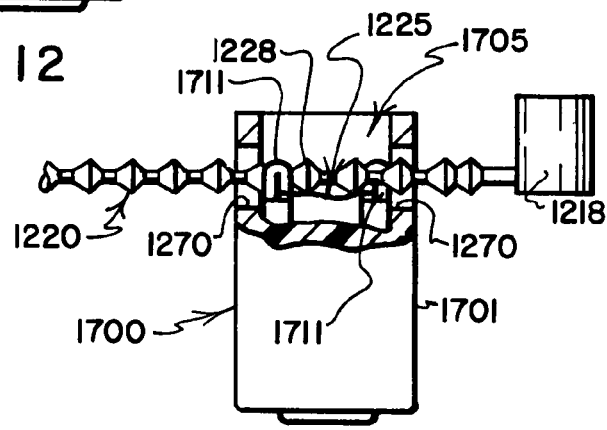
FIG. 13 is a side view similar to FIG. 12 with the loop eliminated from a portion of the heat severable retainer that extends between the opposite side openings of the plug-in heating element module.

A preferred three-step technique for inserting portions of the retainer 1220 through the holes 1270 that are formed in opposite sides of the heating element module 1700 is illustrated in FIGS. 11-13. First, the pointed formation 1217 (FIGS. 7-9) and most of the bead formations 1219 are inserted through one of the holes 1270 with the retainer 1220 oriented in an upwardly inclined direction (depicted in FIG. 11) to bring the tubular sleeve 1218 to a position relatively close to the housing 1701 of the heating element module 1700, as depicted in FIG. 11. Second, the pointed formation 1217 and many of the bead formations 1219 are inserted (with a portion of the retainer 1220 oriented in a downwardly inclined direction, as shown in FIG. 12), leaving a loop 1333 of the retainer 1220 extending upwardly as depicted in FIG. 12. The loop 1333 is then eliminated with care so that a reach 1228 of the retainer 1220 extends substantially linearly through the holes 1270 and over the top of the heating element 1225, as depicted in FIGS. 9 and 13.

In executing the steps illustrated in FIGS. 11-13, care must be taken to not drag the bead formations 1219 across the heating element 1225, or to impact the delicate heating element 1225 in a manner that causes the heating element 1225 to break, or that causes electrical contact to be broken between opposite ends of the heating element 1225 and the posts 1711 that support the heating element 1225 inside the chamber 1705 of the heating element module 1700. When situated as depicted in FIGS. 9 and 13, the heating element reach 1228 will be severed by heat from the heating element 1225 when the heating element 1225 is electrically energized.

Referring to FIG. 14, one possible circuit 1300 that can be incorporated into the control unit 1210 is shown, several of the components of which have already been introduced in the above discussion. The components of the circuit 1300 are identified by numerals having a magnitude of one thousand greater than the numerals that are used to identify corresponding components of the circuit 300 of FIG. 4, and function in substantially the same way described in conjunction with the components of the circuit 300 of FIG. 4. Therefore, the discussion of the operation of the circuit components of FIG. 4 is, for the most part, equally applicable to the corresponding circuit components of FIG. 14.

Referring to FIG. 14, electricity is supplied by the leads 1302, 1304 from the battery 1310 to other components of the circuit 1300 including a conventional, commercially purchased sensor 1340 when the off/on arming switch 1240 (shown in FIGS. 7 and 9) is set to the "on" position. If the sensor 1340 is an acceleration sensor like the acceleration sensor 340 of the circuit 300, the circuit 1300 operates in substantially the same way that the previously described circuit 300 functions. When the sensor 1340 senses acceleration due to liftoff of the rocket 100, the sensor 1340 operates a switch 1350 to supply electricity to the interval timer 1360. When a time interval set on the interval timer 1360 (it may be set by use of a switch 1370 to provide pulses of electricity to the timer 1360 or by some other conventional form of input device) expires, the timer 1360 then operates a switch 1380 to supply electricity through the wire leads 1304, 1390 to the heating element 1225.

Alternatively, the sensor 1340 may comprise a conventional, commercially purchased deceleration sensor that senses deceleration of the rocket 100 such as occurs when the rocket's engine burns out as the rocket approaches flight apogee, and the sensor 1340 may use this condition as a trigger to operate the switch 1350 to supply current to, and to start the operation of the interval timer 1360. Still other alternative types of sensors may comprise the sensor 1340, for example a barometric sensor that supplies current to the interval timer 1360 in response to a sensed pressure that corresponds to the sensing of the rocket 100 reaching a desired altitude above the launch site. Those skilled in the art will readily understand that either of the circuits 300, 1300 can utilize a variety of known detectors and devices to comprise one of the sensors 340, 1340 to initiate operation of an interval timer such as the timers 360, 1360, and, if desired, the interval timers 360, 1360 can be set to "zero" or eliminated so that no time expires between when desired conditions are sensed and current is supplied to other elements of suitable circuitry of the control units 210, 1210.

In one form of operation, after a desired time interval has been set on the interval timer 1360, the arming switch 1240 is set to the "on" position, and the rocket 100 is ready for launch. When the rocket 100 is launched by igniting the engine 150, the acceleration sensor 1340 detects liftoff acceleration and immediately operates the switch 1350 to energize the interval timer 1360. The time interval set on the timer 1360 is a few seconds shorter than the total time required for the launched rocket 100 to travel the full length of the travel path 170 from launch through apogee to the landing of the rocket's components—a time 1) that may be calculated by taking into account information provided by the supplier of the engine 150, information about particular rocket being flown, and information about the atmosphere in which the flight is to take place, etc., or 2) that may be approximated with a reasonable degree of accuracy after test flying the rocket 100 and timing its performance.

When the time interval set on the timer 1360 expires, the timer 1360 operates the switch 1380 to supply electricity by means of the conductors 1304, 1390 to contacts of the jack 1750 of the control unit 1210, and through the contacts of the jack 1750 to the contacts 1703 of the heating element module 1700, thence to the posts 1711 and to the heating element 1225. When the heating element 1225 becomes hot, it melts and severs the adjacent reach 1228 of the retainer 1220 to thereby release the parachute 180 for immediate deployment at a time when components of the rocket 110 are a short time (perhaps only about twenty seconds or so) away from landing at a location that hopefully is only a short distance away from the launch site of the rocket 100.

Referring to FIG. 17, a timer 1710 is shown that can be energized by electricity supplied from conductors 1304, 1704 connected to contact points of the circuit 1300 that are marked in FIG. 14 with the letters A and G, thereby causing the timer 1710 to begin timing when it will operate a switch 1720 to energize a signal device such as the siren 1395 that preferably comprises a component of the control device 1210, as seen in FIGS. 7 and 8. By this arrangement, at a time when components of the rocket 100 have landed, a signal such as a siren sound can be provided that will assist with the recovery of the downed rocket components.

Referring to FIG. 18, a timer 1810 is shown that can be energized by electricity supplied by conductors 1304, 1804 connected to contact points of the circuit 1300 that are marked in FIG. 14 with the letters A and G, or B and G, or C and G. Depending on which of the contact points A, B or C that the conductor 1804 is connected to, the timer 1810 will operate a switch 1820 after a time interval that begins the timer 1810 begins running concurrently with components of the circuit 1300 that are energized concurrently with the energization of the contact points A, B or C.

When the switch 1820 is operated by the timer 1810, current is supplied by conductors 1304, 1805 to additional contacts of the jack 1750 of the control unit 1210 so that a second device (i.e., a device, not shown, plugged into the branch 1612 of the extension cord 1610 in addition to one of the heating element modules 1700 which is plugged into the other branch 1611 of the dual-branch extension cord 1610 of FIG. 15) can be operated at a desired time that may be the same as, or may differ from the time when electricity is supplied to the heating element module 1700. Thus, the dual-branch extension cord 1610 plugged into the control unit jack 1750 can be used to operate or energize two different devices, at least one of which typically takes the form of one of the heating element modules 1700.

If the jack 1750 of the control unit 1210 provides only the contacts that are depicted in the circuit of FIG. 14, then, regardless of which of the extension cords 1510, 1610 may be plugged into the jack 1750, the branches of these extension cords will be energized only when a voltage appears across the conductors 1304, 1390. In this circumstance, if the dual-branch extension cord 1610 of FIG. 16 is plugged into the jack 1750, its two branches 1611, 1612 can concurrently supply electrical energy to two different devices, such as a pair of the heating element modules 1700 that might, for instance, be used in tandem to ensure that a retainer, such as one of the retainers 220, 400, 1220 definitely is severed at a desired time.

However, if the jack 1750 of the control unit 1210 provides not only the contacts that are depicted in the circuit of FIG. 14 but also the contacts that are depicted in the add-on circuit of FIG. 18, the added contacts shown in FIG. 17 will be energized when a voltage appears across the conductors 1304, 1805; and, if the branches 1611, 1612 of the dual-branch extension cord 1610 of FIG. 16 connect to separate pairs of these separately energized contacts of the jack 1750, the branches 1611, 1612 can operate different devices at different times, depending on how the associated main timer 1360 of FIG. 14 and the auxiliary timer 1810 are set.

Although the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention. It is intended that any patent eventually issuing on this invention shall cover such patentable features as are found to be present in the invention disclosed.

What is claimed is:

1. An apparatus comprising a model rocket having internally tethered-together components that separate after a launch of the rocket, with the tethered-together components including a recovery device that includes a single parachute tightly wrapped by and held in compact bundle form by an elongate band of plastic until after being released from inside the rocket, with the recovery device further including electrical circuitry having a source of electricity and an electrical switch that supply electricity to a heating element extending along a heat-severable reach of the elongate band of plastic material to heat and thereby sever the elongate band of plastic material to deploy the parachute and slow the descent of the tethered-together components at a delayed time after the compact bundle form has been released from the launched rocket and after the tethered-together components including the compact bundle form have descended a substantial distance to near ground.

2. The apparatus of claim 1 wherein the electrical circuity includes a sensor and an interval timer that cooperate to cause the supply of electricity to the heating element to occur at a timed interval after the sensor detects a desired condition of the rocket.

3. The apparatus of claim 2 wherein the sensor detects a predetermined change in velocity of the rocket.

4. The apparatus of claim 2 wherein the sensor is an acceleration sensor capable of detecting the launch of the rocket.

5. The apparatus of claim 2 wherein the sensor is selected from a group comprising an acceleration sensor, a deceleration sensor and an altitude sensor.

6. The apparatus of claim 1 wherein the electrical circuitry includes a signal responsive electrical switch that connects the heating element to the source of electricity.

7. The apparatus of claim 1 wherein the electrical circuitry includes a rocket condition sensor-operated electrical switch that connects the heating element to the source of electricity.

8. The apparatus of claim 1 wherein the electrical circuitry includes a battery that supplies electricity to the heating element.

9. A combination comprising a model rocket having tethered-together components that include a deployment control that is carried aloft within a the model rocket together with a parachute-type rocket recovery device by a launch of the rocket, with the recovery device further including A) a heating element connected to and extending along a heat-severable reach of an elongate retainer in the form of a band of plastic material that extends closely about a canopy of a parachute in a tightly wrapped manner to retain the canopy in a compact bundle form until a delayed time after the compact bundle form is released from within the rocket whereupon the heat-severable retainer reach is heated and severed as the result of electricity being supplied to the heating element to thereby deploy the parachute canopy from the compact bundle form to thereby slow the descent of the tethered-together components of the rocket, and B) circuitry far supplying electricity to the heating element to heat and sever the retainer reach at the delayed time as the tethered-together components descend to near ground, including a battery-type source of electricity and a signal responsive electrical switch.

10. A combination comprising a model rocket that have tethered-together components that include, A) a parachute that is carried aloft with a the model rocket, B) an elongate retainer in the form of a band of plastic material extending about the parachute in a tightly wrapped manner that retains the parachute in a compact bundle until the elongate retainer is released, C) an electrical heating element extending along a heat-severable reach of the elongate retainer that can be supplied with electricity and thereby heated to sever the retainer and deploy the parachute from the compact bundle D) electrical circuitry including a source of electricity and an electrical switch supplying electricity to the heating element to heat and sever the heat-severable reach at a delayed time after the compact bundle has been released from the rocket and as the descent of the tethered-together components nears the around to then slow the descent of the tethered-together components of the launched rocket descend to near ground.

11. The combination of claim 10 wherein the electrical switch is a signal responsive electrical switch connecting the heating element to the source of electricity.

12. The combination of claim 10 wherein the electrical switch is a rocket condition responsive switch electrically connecting the heating element to the source of electricity.

13. The combination of claim 10 wherein the electrical switch is a timer controlled switch electrically connecting the heating element to the source of electricity.

14. A model rocket saving comprising tethered together components that separate near flight apogee of the rocket to release from the rocket a recovery device that includes A) a parachute held in a compact bundle form during the release by an elongate retainer in the form of a band of plastic material extending closely about the compact bundle in a tightly wrapped manner that, after release of the compact bundle, can be severed by being heated, B) an electrically operable heating element extending adjacent a portion of the retainer for being supplied with electricity to heat and thereby sever the retainer to deploy the parachute, and C) electrical circuitry including a source of electricity and a signal responsive switch that connect the heating element to the source of electricity for operating the heating element to heat and sever the retainer and to thereby deploy the parachute from the compact bundle form in response to receipt of an operating signal at a delayed time after the release as the tethered-together components of the rocket have descended a substantial distance to near ground.

\* \* \* \* \*